(12) United States Patent
Noguchi et al.

(10) Patent No.: US 10,190,666 B2
(45) Date of Patent: Jan. 29, 2019

(54) DIFFERENTIAL DEVICE

(71) Applicant: MUSASHI SEIMITSU INDUSTRY CO., LTD., Toyohashi-Shi, Aichi (JP)

(72) Inventors: Takanori Noguchi, Toyohashi (JP); Tetsuro Hamada, Toyohashi (JP); Shohei Sakata, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 184 days.

(21) Appl. No.: 15/319,944

(22) PCT Filed: Jun. 8, 2015

(86) PCT No.: PCT/JP2015/066461
§ 371 (c)(1),
(2) Date: Dec. 19, 2016

(87) PCT Pub. No.: WO2015/198845
PCT Pub. Date: Dec. 30, 2015

(65) Prior Publication Data
US 2017/0152931 A1    Jun. 1, 2017

(30) Foreign Application Priority Data

Jun. 24, 2014 (JP) ................. 2014-129376
Jun. 24, 2014 (JP) ................. 2014-129377

(51) Int. Cl.
*F16H 48/14* (2006.01)
*F16H 48/05* (2012.01)
*F16H 57/037* (2012.01)

(52) U.S. Cl.
CPC ............ *F16H 48/14* (2013.01); *F16H 48/05* (2013.01); *F16H 57/037* (2013.01)

(58) Field of Classification Search
CPC ......... F16H 48/05; F16H 48/14; F16H 57/037
(Continued)

(56) References Cited

U.S. PATENT DOCUMENTS 1,405,986 A * 2/1922 Elbertz ............... F16H 48/10
                                                    475/174
1,483,606 A    2/1924 Krohn
(Continued)

FOREIGN PATENT DOCUMENTS

CN    101290059 A    10/2008
CN    2011-87562 Y    1/2009
(Continued)

*Primary Examiner* — Ha Dinh Ho
(74) *Attorney, Agent, or Firm* — Carrier Blackman & Associates, P.C.; Joseph P. Carrier; Fulchand P. Shende

(57) ABSTRACT

A differential device is provided in which a first wave number (Z1) of a first hypo groove part on an input plate, a second wave number (Z2) of a first epi groove part on a first differential plate and opposing the first hypo groove part, a third wave number (Z3) of a second hypo groove part on the first differential plate and on the opposite side from the first epi groove part, and a fourth wave number (Z4) of a second epi groove part on a second differential plate and opposing the second hypo groove part are set as Z1=8, Z2=Z3=6 and Z4=4, or as Z1=Z4=6, Z2=4, Z3=8. Such differential device enables equal torque distribution and equal differential rotation via a cycloid reduction mechanism without using a bevel gear or a center plate.

17 Claims, 9 Drawing Sheets

(58) Field of Classification Search
USPC .......................................................... 74/650
See application file for complete search history.

(56) References Cited

U.S. PATENT DOCUMENTS

| | | | | |
|---|---|---|---|---|
| 1,716,073 A * | 6/1929 | McFarlane | .............. | F16H 48/10 475/174 |
| 1,730,183 A * | 10/1929 | Wildhaber | .............. | F16H 48/10 475/174 |
| 2,322,394 A * | 6/1943 | Sharpe | .................... | F16H 48/10 416/129 |
| 3,198,035 A * | 8/1965 | Mueller | .................. | F16H 48/18 74/650 |
| 3,768,336 A * | 10/1973 | Wharton | ................. | F16H 48/10 475/248 |
| 4,665,769 A * | 5/1987 | Parsons | .................. | F16H 48/10 475/174 |

FOREIGN PATENT DOCUMENTS

| | | | |
|---|---|---|---|
| CN | 201187561 | Y | 1/2009 |
| EP | 1 167 824 | A2 | 1/2002 |
| FR | 2809153 | A1 | 11/2001 |
| JP | H08-170705 | A | 7/1996 |
| JP | H09-144852 | A | 6/1997 |
| JP | 2002-005263 | A | 1/2002 |
| JP | 2003-172419 | A | 6/2003 |
| JP | 2008-157391 | A | 7/2008 |
| JP | 2009-121494 | A | 6/2009 |
| JP | 2009-195002 | A | 8/2009 |

* cited by examiner

DIFFERENTIAL DEVICE

TECHNICAL FIELD

The present invention relates to a differential device with a new mechanism that distributes rotational power of an input plate between a first output shaft and a second output shaft relatively rotatably arranged on the same rotational axis via a cycloid reduction mechanism or a trochoid reduction mechanism and, in particular, to one that is suitably used as a differential device that allows differential rotation between left and right or front and rear driven wheels of an automobile.

BACKGROUND ART

In a conventional differential device employing a bevel gear, not only is it impossible to avoid the occurrence of a teeth-rattling noise, which are characteristic of bevel gear meshing, but since the number of simultaneously-meshing teeth are only some of the total number of teeth, the torque is also borne only by some of the teeth, and there is room for improvement in terms of strength and durability.

A differential device employing a ball mechanism as in Patent Document 1 is known, but since in this device, a plurality of balls are slidably held by a plurality of radial elongated holes of the center plate, opposite side parts, exposed through the elongated holes, of these balls are rollably engaged with transmission grooves of left and right disk plates, when there is differential motion of the left and right disk plates, the balls move on the three, that is, the elongated hole and the left and right transmission grooves, at the same time, and the frictional resistance of the ball at that time therefore causes a large power loss, thus affecting the engine fuel consumption performance.

Furthermore, a cycloid type transmission mechanism as in Document 2 in the related art is also known, but this is a simple transmission mechanism, and its application as a differential device is difficult.

RELATED ART DOCUMENTS

Patent Documents

Patent Document 1: Japanese Patent Application Laid-open No. 8-170705
Patent Document 2: Japanese Patent Application Laid-open No. 2003-172419

SUMMARY OF THE INVENTION

Problems to be Solved by the Invention

The present invention has been accomplished in light of such circumstances, and it is an object thereof to provide a differential device that enables equal torque distribution, in which a torque distribution equally divided between left and right output shafts is maintained, and equal differential rotation, in which when different rotations are given to two output shafts when the vehicle turns the increase in rotational speed of one output shaft is made equal to the decrease in rotational speed of the other output shaft without changing the rotational speed of an input member, by the use of a two-stage type cycloid reduction mechanism or trochoid reduction mechanism without using a bevel gear or a center plate with radial elongated holes as in a conventional differential device.

Means for Solving the Problems

In order to attain the above object, according to a first aspect of the present invention, there is provided a differential device that distributes rotational power of an input plate between a first output shaft and a second output shaft relatively rotatably arranged on a first rotational axis via a cycloid reduction mechanism or a trochoid reduction mechanism, wherein the reduction mechanism comprises a first differential plate that is disposed so as to be adjacent to one side of the input plate rotating around the first rotational axis, a second differential plate that is disposed so as to be adjacent to one side, on the side opposite to the input plate, of the first differential plate, and an eccentric shaft that supports the first differential plate so as to be able to rotate around a second rotational axis that is eccentric from the first rotational axis, the eccentric shaft being connected to the first output shaft so as to be able to rotate as a unit, and the second differential plate being connected to the second output shaft so as to be able to rotate as a unit, a first hypo groove part that extends in a peripheral direction along a hypocycloid curve or a hypotrochoid curve of a first wave number is formed in one side face, opposing the first differential plate, of the input plate, a first epi groove part that extends in the peripheral direction along an epicycloid curve or an epitrochoid curve of a second wave number is formed in one side face, opposing the input plate, of the first differential plate, a plurality of first rolling bodies are held between the two groove parts in an area where the two groove parts overlap one on another, a second hypo groove part that extends in the peripheral direction along a hypocycloid curve or a hypotrochoid curve of a third wave number is formed in the other side face, opposing the second differential plate, of the first differential plate, a second epi groove part that extends in the peripheral direction along an epicycloid curve or an epitrochoid curve of a fourth wave number is formed in one side face, opposing the first differential plate, of the second differential plate, a plurality of second rolling bodies are held between the two groove parts in an area where these two groove parts overlap one on another, and the first wave number is 8, the second wave number and the third wave number are both 6, and the fourth wave number is 4, or the first wave number and the fourth wave number are both 6, the second wave number is 4, and the third wave number is 8.

Further, according to a second aspect of the present invention, in addition to the first aspect, a differential case that is supported on a transmission case of an automobile so as to be able to rotate around the first rotational axis comprises the input plate and a cover that is fixed to the input plate and covers the first differential plate, the eccentric shaft, and the second differential plate.

Furthermore, according to a third aspect of the present invention, in addition to the second aspect, the eccentric shaft has a center shaft portion that rotates around the first rotational axis and an eccentric shaft portion that projects radially from the center shaft portion and supports the first differential plate so as to be able to rotate around the second rotational axis, the center shaft portion extends through a middle part of the input plate and is connected to the first output shaft, the second differential plate has a center shaft that rotates around the first rotational axis, and the center shaft extends through a middle part of the cover and is connected to the second output shaft.

Moreover, according to a fourth aspect of the present invention, in addition to the third aspect, the input plate and the cover have hollow cylindrical first and second shafts that are rotatably supported on the transmission case on the first rotational axis, the center shaft portion of the eccentric shaft is rotatably supported on an inner periphery of the first shaft via a first bearing, the center shaft of the second differential plate is rotatably supported on an inner periphery of the second shaft via a second bearing, and the center shaft portion of the eccentric shaft on a side opposite to the first shaft is fitted via a third bearing into a circular recess portion formed in the one side face of the second differential plate.

Further, according to a fifth aspect of the present invention, in addition to any one of the first to fourth aspects, a cutout portion is formed in a middle part of the one side face of the input plate.

Furthermore, according to a sixth aspect of the present invention, in addition to the first aspect, a cutout portion is formed in a middle part of the one side face of the input plate, and a balancer that is linked to the eccentric shaft is disposed within the cutout portion so that the balancer rotates around the first rotational axis with a phase that is displaced by 180 degrees from a phase of a center of gravity of the first differential plate rotating around the first rotational axis.

Moreover, according to a seventh aspect of the present invention, in addition to the sixth aspect, when a mass of the first differential plate is M1, a mass of the balancer is M2, a distance from the first rotational axis to the center of gravity of the first differential plate when viewed on a projection plane orthogonal to the first rotational axis is e1, and a distance from the first rotational axis to the center of gravity of the balancer is e2, $$|M1 \times e1 - M2 \times e2| < M1 \times e1/100$$

is satisfied.

Further, according to an eighth aspect of the present invention, in addition to the sixth or seventh aspect, the eccentric shaft has a center shaft portion that rotates around the first rotational axis and an eccentric shaft portion that projects radially from the center shaft portion and supports the first differential plate so as to be able to rotate around the second rotational axis, the balancer has an arm portion that extends radially outwardly from an outer periphery of the center shaft portion in a direction that is opposite to a direction in which the eccentric shaft portion projects, and a weight portion that is connected to an extremity of the arm portion, and an outer periphery of the weight portion is formed into an arc shape along an inner periphery of the cutout portion.

Furthermore, according to a ninth aspect of the present invention, in addition to the eighth aspect, the balancer is formed integrally with the center shaft portion.

Moreover, according to a tenth aspect of the present invention, in addition to any one of the sixth to ninth aspects, a differential case that is supported on a transmission case of an automobile so as to be able to rotate around the first rotational axis comprises the input plate and a cover that is fixed to the input plate and covers the first differential plate, the eccentric shaft, the balancer and the second differential plate.

Further, according to an eleventh aspect of the present invention, in addition to any one of the sixth to tenth aspect, a cylindrical auxiliary cutout portion that opposes the cutout portion of the input plate with the first differential plate sandwiched therebetween is formed in a middle part of the one side face of the second differential plate, and an auxiliary balancer is disposed within the auxiliary cutout portion, the auxiliary balancer being linked to the eccentric shaft so as to rotate around the first rotational axis with the phase that is displaced by 180 degrees from the phase of the center of gravity of the first differential plate rotating around the first rotational axis.

Furthermore, according to a twelfth aspect of the present invention, in addition to any one of the first to eleventh aspects, wherein the first differential plate is formed so as to include a pair of rotating plates that are linked to each other and can rotate as a unit.

Effects of the Invention

In accordance with the first aspect of the present invention, the cycloid reduction mechanism or trochoid reduction mechanism forming the differential device comprises the first differential plate which is disposed so as to be adjacent to one side of the input plate rotating around the first rotational axis, the second differential plate disposed so as to be adjacent to one side of the first differential plate that is opposite to the input plate, and the eccentric shaft supporting the first differential plate so that it can rotate around the second rotational axis, which is eccentric from the first rotational axis. The eccentric shaft is connected to the first output shaft so that they can rotate as a unit, the second differential plate is connected to the second output shaft so that they can rotate as a unit, the first hypo groove part extending in the peripheral direction along the hypocycloid curve or the hypotrochoid curve of the first wave number is formed in the one side face, opposing the first differential plate, of the input plate, the first epi groove part extending in the peripheral direction along the epicycloid curve or the epitrochoid curve of the second wave number is formed in the one side face, opposing the input plate, of the first differential plate, the plurality of first rolling bodies are held between these two groove parts in an area where the two groove parts overlap one on another, the second hypo groove part extending in the peripheral direction along the hypocycloid curve or the hypotrochoid curve of the third wave number is formed in the other side face, opposing the second differential plate, of the first differential plate, the second epi groove part extending in the peripheral direction along the epicycloid curve or the epitrochoid curve of the fourth wave number is formed in the one side face, opposing the first differential plate, of the second differential plate, and the plurality of second rolling bodies are held between these two groove parts in an area where the two groove parts overlap one on another; with regard to the first to fourth wave numbers, the first wave number is 8, the second wave number and the third wave number are both 6, and the fourth wave number is 4 or the first wave number and the fourth wave number are both 6, the second wave number is 4, and the third wave number is 8. Therefore, when the input plate is rotated, in the case in which the first and second output shafts are not given a difference in rotational speed, the first and second output shafts can be rotated integrally with the input plate, and in the case in which the first and second output shafts are given a difference in rotational speed, a differential mechanism that enables equal differential rotation in which the amount of increase in rotational speed of one of the output shafts is made equal to the amount of decrease in rotational speed of the other output shaft can be achieved without using a bevel gear or a center plate with radial elongated holes.

That is, in the differential device having the above arrangement, now when the input plate is fixed and the first output shaft is rotated, the first differential plate connected to the first output shaft via the eccentric shaft attempts to rotate around the first rotational axis of the first output shaft, but since the plurality of first rolling bodies are held between the first hypo groove part formed in the one side face of the input plate and the first epi groove part formed in the one side face of the first differential plate, the first differential plate revolves around the first rotational axis of the first output shaft while spinning with the second rotational axis of the eccentric shaft as the center. In this arrangement, since the plurality of second rolling bodies are held between the second hypo groove part formed in the other side face of the first differential plate and the second epi groove part formed in the one side face of the second differential plate, when the first differential plate revolves and spins due to rotation of the first output shaft, the second differential plate rotates in association therewith at a different rotational speed from that of the first output shaft with the first rotational axis of the second output shaft as the center, and the rotation of the first output shaft is changed in speed and transmitted to the second output shaft. Because of this, when the input plate is rotated in a state in which the first and second output shafts are rotating in this way, the rotation in which the rotational speed of the input plate is added to the rotational speed of the first and second output shafts is outputted to the respective output shaft.

The reduction ratio when transmitting the rotation of the first output shaft to the second output shaft using such a reduction mechanism is represented by $[1-\{(Z1 \times Z3)/(Z2 \times Z4)\}]$ in which the first wave number is $Z1$, the second wave number is $Z2$, the third wave number is $Z3$, the fourth wave number is $Z4$, but in the invention of the present application since $Z1=8$, $Z2=Z3=6$, and $Z4=4$ or $Z1=Z4=6$, $Z2=4$, and $Z3=8$, in either case the reduction ratio can be $-1$. Since this means that when the input plate is fixed and one of the output shafts is rotated n times the other output shaft rotates n times in the opposite direction, and when rotation is being supplied to the input plate, equal differential rotation in which if the rotational speed of one of the output shafts is increased only by n rotations from the rotational speed of the input plate the rotational speed of the other output shaft is decreased only by n rotations from the rotational speed of the input plate is carried out. In addition, when the rotational speed of one of the output shafts is not increased from the rotational speed of the input plate, that is, when there is no differential rotation between the first and second output shafts, since these first and second output shafts have a rotational speed that is equal to the rotational speed of the input plate, in this case the first and second output shafts naturally rotate integrally with the input plate. Moreover, as described later, due to the first to fourth wave numbers being set to the above values, an equal distribution of torque between the first and second output shafts becomes possible, and a differential mechanism that enables equal distribution of torque and equal differential rotation can be realized without using a bevel gear or a center plate with radial elongated holes.

In this way, in accordance with the first aspect of the present invention, since the differential mechanism may be formed from the cycloid reduction mechanism or the trochoid reduction mechanism, it is possible to minimize the axial length of the differential mechanism and make it compact. Moreover, there is no occurrence of a teeth-ratting noise as in the case of the use of a bevel gear, it is unnecessary to employ a center plate with radial elongated holes, which causes sliding of the rolling body, and it is therefore possible to efficiently transmit power from the input plate to the first and second output shafts. Furthermore, since all of the first and second rolling bodies transmit the torque while dispersing it between the first hypo groove part and the first epi groove part and between the second hypo groove part and the second epi groove part, it is possible to reduce the torque that each of the rolling bodies transmits, thus improving the strength and durability of the rolling bodies.

Furthermore, in accordance with the second aspect of the present invention, since the differential case supported on the transmission case of an automobile so that it can rotate around the first rotational axis comprises the input plate and the cover, which is fixed to the input plate and covers the first differential plate, the eccentric shaft, and the second differential plate, a two-stage type transmission mechanism employing the cycloid reduction mechanism or the trochoid reduction mechanism can be suitably used as a differential device that allows differential rotation of left and right or front and rear driven wheels of the automobile. Moreover, since the input plate forms part of the differential case, it is possible to reduce the number of components, and since the first and second differential plates and the eccentric shaft are housed within the differential case, it is possible to form a differential device having such a new mechanism in a compact manner without greatly changing the arrangement of a conventional differential device.

Moreover, in accordance with the third aspect of the present invention, the eccentric shaft has the center shaft portion rotating around the first rotational axis and the eccentric shaft portion projecting radially from the center shaft portion and supporting the first differential plate so that it can rotate around the second rotational axis, the center shaft portion extends through the middle part of the input plate and is connected to the first output shaft, the second differential plate has the center shaft rotating around the first rotational axis, and the center shaft extends through the middle part of the cover and is connected to second output shaft, therefore making it possible to simply assemble the eccentric shaft, the first differential plate, and the second differential plate within the differential case merely by supporting the first differential plate on the eccentric shaft portion of the eccentric shaft having the center shaft portion extending through the middle part of the input plate and by disposing the second differential plate having the center shaft extending through the middle part of the cover outside the first differential plate.

Furthermore, in accordance with the fourth aspect of the present invention, since the input plate and the cover have the hollow cylindrical first and second shaft parts rotatably supported on the transmission case on the first rotational axis, the center shaft portion of the eccentric shaft is rotatably supported on the inner periphery of the first shaft part via the first bearing, the center shaft of the second differential plate is rotatably supported on the inner periphery of the second shaft part via the second bearing, and the center shaft portion of the eccentric shaft on the side opposite to the first shaft part is fitted via the third bearing into the circular recess portion formed in the one side face of the second differential plate, it is possible to ensure smooth relative rotation of the eccentric shaft and the second differential plate within the differential case merely by means of the first to third bearings.

Moreover, in accordance with the fifth aspect of the present invention, since the cutout portion is formed in the middle part in the one side face of the input plate, it is possible to reduce the material of the unnecessary portion of the input plate, thus reducing the cost of the differential device and also lightening the weight of the differential device.

Furthermore, in accordance with the sixth aspect of the present invention, since the cylindrical cutout portion is formed in a middle part of the one side face of the input plate, and the balancer linked to the eccentric shaft so as to rotate around the first rotational axis with a phase that is displaced by 180 degrees from the phase of the center of gravity of the first differential plate rotating around the first rotational axis is disposed within the cutout portion, it is possible to counterbalance unbalanced rotation of the first differential plate by means of the balancer, thereby suppressing effectively the occurrence of vibration due to the centrifugal force caused by the amount of imbalance of the first differential plate and the accompanying noise. Furthermore, disposing the balancer within the cutout portion of the input plate enables the balancer to be disposed in a compact manner between the first differential plate and the input plate, and it is possible to reduce the material of an unnecessary portion of the input plate by means of the cutout portion, thereby reducing the cost of the differential device and lightening the weight of the differential device.

Moreover, in accordance with the seventh aspect of the present invention, since the difference between the amount of imbalance of the first differential plate and the amount of imbalance of the balancer is made less than 1/100 of the amount of imbalance of the first differential plate, which is a small value, it is possible to make the amount of imbalance of the first differential plate and the amount of imbalance of the balancer substantially the same, and it is possible to optimize the mass and the amount of eccentricity of the balancer with respect to the mass and the amount of eccentricity of the first differential plate.

Furthermore, in accordance with the eighth aspect of the present invention, since the eccentric shaft has the center shaft portion rotating around the first rotational axis and the eccentric shaft portion projecting radially from the center shaft portion and supporting the first differential plate so that it can rotate around the second rotational axis, the balancer has the arm portion extending radially outwardly from the outer periphery of the center shaft portion in a direction opposite to the direction in which the eccentric shaft portion projects and the weight portion connected to the extremity of the arm portion, and the outer periphery of the weight portion is formed into an arc shape along the inner periphery of the cutout portion and is adjacent to the inner periphery of the cutout portion, it is possible to make the weight portion of the balancer as close to the inner peripheral face of the cutout portion as possible, thus separating the center of gravity of the balancer from the rotational center of the balancer and thereby suppressing any increase in the weight due to the balancer.

Moreover, in accordance with the ninth aspect of the present invention, since the balancer is formed integrally with the center shaft portion, there is no case in which the positional relationship between the balancer and the eccentric shaft changes, and it is always possible to rotate the balancer with a phase that is displaced by 180 degrees from the center of gravity of the first differential plate.

Furthermore, in accordance with the tenth aspect of the present invention, since the differential case supported on the transmission case of the automobile so that it can rotate around the first rotational axis comprises the input plate and the cover fixed to the input plate and covering the first differential plate, the eccentric shaft, the balancer, and the second differential plate, a two-stage type transmission mechanism employing the cycloid reduction mechanism or the trochoid reduction mechanism can be suitably used as a differential device that allows differential rotation of left and right or front and rear driven wheels of the automobile, and since the input plate forms part of the differential case, it is possible to reduce the number of components. Furthermore, due to the balancer being disposed in the cutout portion of the input plate the first and second differential plates and the eccentric shaft can be housed compactly within the differential case, and it is therefore possible to form an automobile differential device with such a new mechanism without greatly changing the arrangement of the conventional differential device.

Moreover, in accordance with the eleventh aspect of the present invention, since the cylindrical auxiliary cutout portion opposing the cutout portion of the input plate with the first differential plate sandwiched therebetween is formed in the middle part of the one side face of the second differential plate, and the auxiliary balancer linked to the eccentric shaft is disposed within the auxiliary cutout portion so as to rotate around the first rotational axis with a phase that is displaced by 180 degrees from the phase of the center of gravity of the first differential plate rotating around the first rotational axis, it is possible to counterbalance the unbalanced rotation of the first differential plate from the left and the right with good balance by means of the balancer and the auxiliary balancer disposed on opposite sides of the first differential plate, thus suppressing further effectively the occurrence of vibration due to the centrifugal force caused by the amount of imbalance of the first differential plate as well as decreasing the mass of each of the balancer and the auxiliary balancer and making them compact.

Furthermore, in accordance with the twelfth aspect of the present invention, since the first differential plate is formed so as to include the pair of rotating plates, which are linked to each other and can be rotated as a unit, the first differential plate can be formed from the two separate rotating plates. Because of this, for example, a production method in which the two rotating plates each having a groove part in one side face are molded by forging, etc., and are then linked may be employed, and the groove parts having excellent strength can be quickly and easily formed, thus improving the ease of the production operation. Furthermore, since the size of a face, opposing the input plate, and the size of a face, opposing the second differential plate, of the first differential plate can be set independently from each other, even when the second wave number is 4 and the third wave number is 8, the degree of freedom in design improves.

The first and second rolling bodies correspond to first and second rolling balls 18 and 19 of an embodiment of the present invention, which is described later, but it is not necessary for these rolling bodies to be rolling balls in particular, and they may for example have a roller shape.

EXPLANATION OF REFERENCE NUMERALS AND SYMBOLS

Figure 1:
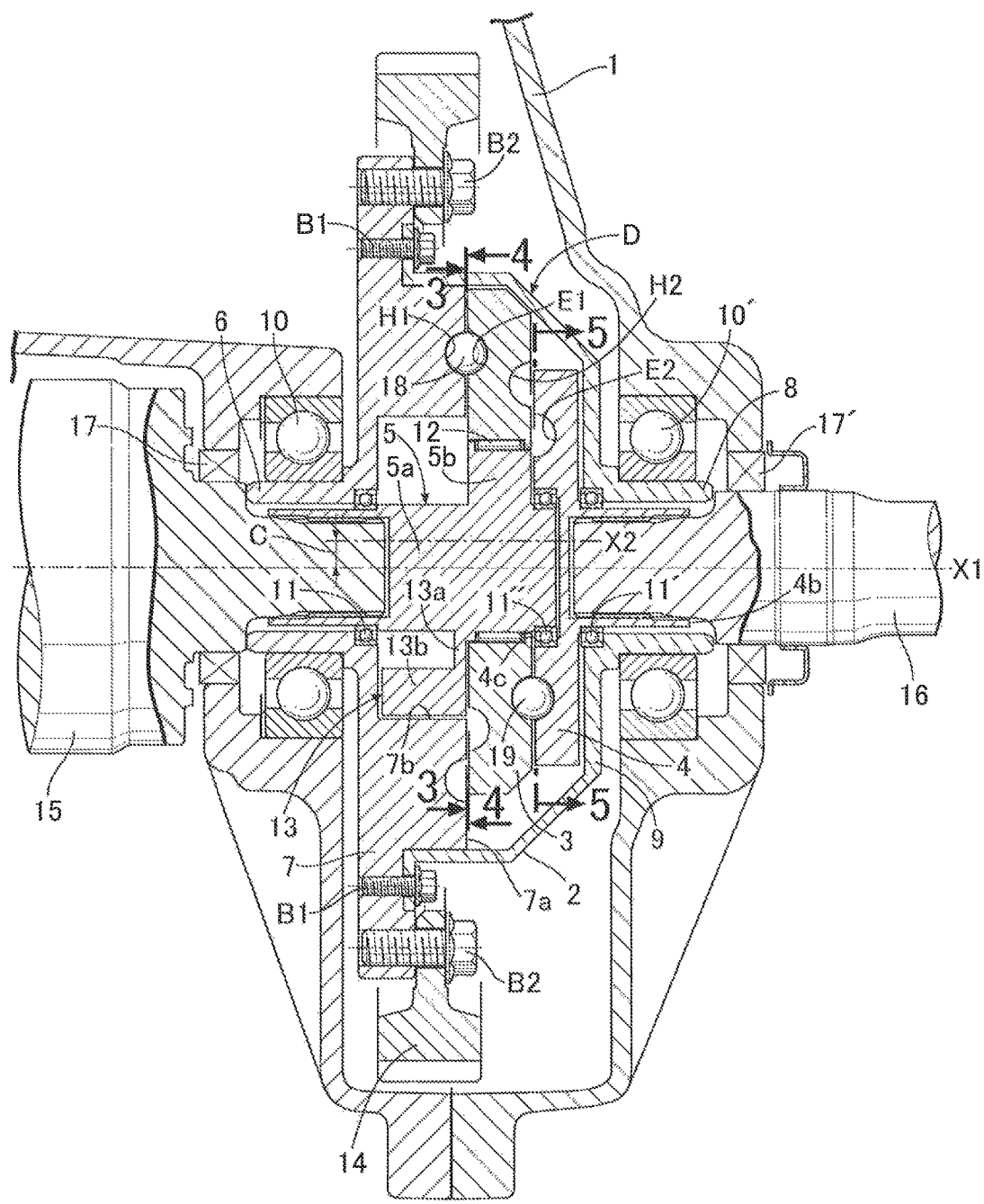
FIG. 1 is a sectional front view of a differential device related to a first embodiment of the present invention when $Z1=8$, $Z2=Z3=6$, and $Z4=4$. (first embodiment)

1 Transmission case
2 Differential case
3 First differential plate
3a One side face of first differential plate
3b Other side face of first differential plate
3c Rotating plate (first rotating plate)
3d Rotating plate (second rotating plate)
4 Second differential plate
4a One side face of second differential plate
4b Center shaft of second differential plate
4c Circular recess portion of second differential plate
5 Eccentric shaft
5a Center shaft portion
5b Eccentric shaft portion
6 First shaft
7 Input plate
7a One side face of input plate
7b Cutout portion of input plate
8 Second shaft
9 Cover
13 Balancer
13a Arm portion
13b Weight portion
15 First output shaft
16 Second output shaft
18 First rolling body (first rolling ball)
19 Second rolling body (second rolling ball)
20 Auxiliary balancer
E1 First epi groove part
E2 Second epi groove part
G1 Center of gravity of first differential plate
G2 Center of gravity of balancer
H1 First hypo groove part
H2 Second hypo groove part
X1 First rotational axis
X2 Second rotational axis
Z1 First wave number of first hypo groove part
Z2 Second wave number of first epi groove part
Z3 Third wave number of second hypo groove part
Z4 Fourth wave number of second epi groove part

MODES FOR CARRYING OUT THE INVENTION

Embodiments of the present invention are explained by reference to the attached drawings.

First Embodiment

First, referring to FIG. 1 to FIG. 7, a first embodiment in which the differential device of the present invention is used as an automobile differential device is explained.

In FIG. 1, a differential device D housed within an automobile transmission case 1 includes a differential case 2, and first and second differential plates 3 and 4 and an eccentric shaft 5 housed within the differential case 2. The differential case 2 is formed from a circular input plate 7 that has a hollow cylindrical first shaft 6 and a cover 9 that has a hollow cylindrical second shaft 8 arranged on the same axis as the first shaft 6 and whose outer periphery is fixed to an outer peripheral part of the input plate 7 via a bolt B1 while covering the first and second differential plates 3 and 4 and the eccentric shaft 5, these first and second shafts 6 and 8 being supported on the transmission case 1 via bearings 10 and 10' so as to be rotatable around a first rotational axis X1.

The first differential plate 3 is disposed within the differential case 2 so as to be adjacent to one side of the input plate 7, and the second differential plate 4 is disposed within the differential case 2 so as to be adjacent to one side of the first differential plate 3 that is on the side opposite to the input plate 7.

Figure 2:
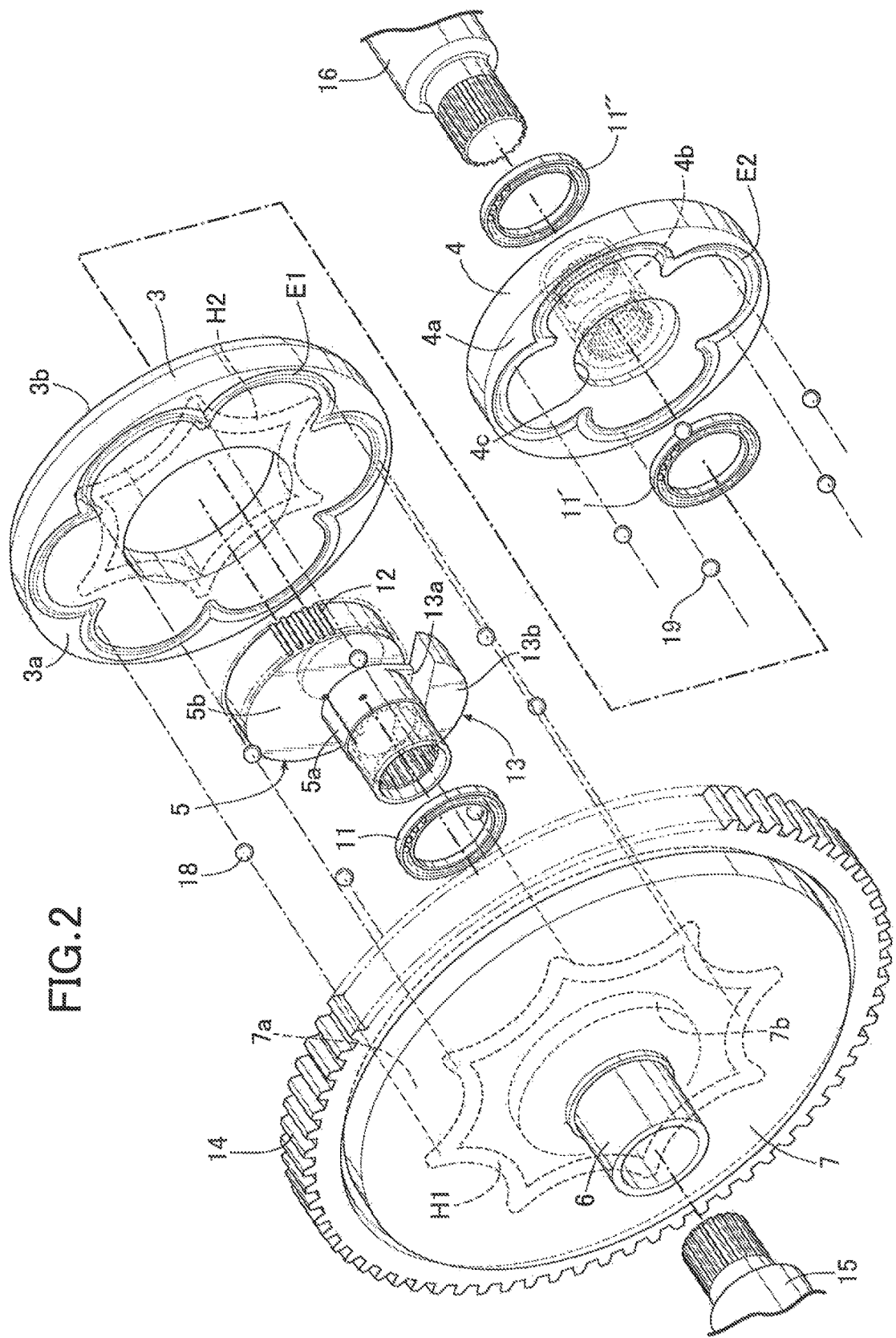
FIG. 2 is a schematic diagram of the differential device of FIG. 1. (first embodiment)

Furthermore, referring in addition to the schematic diagram of FIG. 2, the eccentric shaft 5 has a center shaft portion 5a and an eccentric shaft portion 5b that projects radially from the center shaft portion 5a; the center shaft portion 5a is supported on the inner periphery of the first shaft 6 via a first bearing 11 so as to be rotatable around the first rotational axis X1, and the eccentric shaft portion 5b having a second rotational axis X2 that is eccentric from the first rotational axis X1 only by C rotatably supports the first differential plate 3 on the outer periphery thereof via a needle bearing 12, thus enabling the first differential plate 3 to revolve around the first rotational axis X1 and spin around the second rotational axis X2.

Furthermore, with regard to the second differential plate 4, a center shaft 4b provided on a side face on the second shaft 8 side extends through a middle part of the cover 9 and is rotatably supported on the inner periphery of the second shaft 8 via a second bearing 11', thus enabling it to rotate around the first rotational axis X1 relative to the second shaft 8. Moreover, the center shaft portion 5a, on the side opposite to the first shaft 6, of the eccentric shaft 5 is fitted into a circular recess portion 4c formed in a side face, on the first differential plate 3 side, of the second differential plate 4 via a third bearing 11", thus enabling the eccentric shaft 5 and the second differential plate 4 to rotate smoothly relative to each other within the differential case 2 by means of only the first to third bearings 11 to 11".

Figure 4:
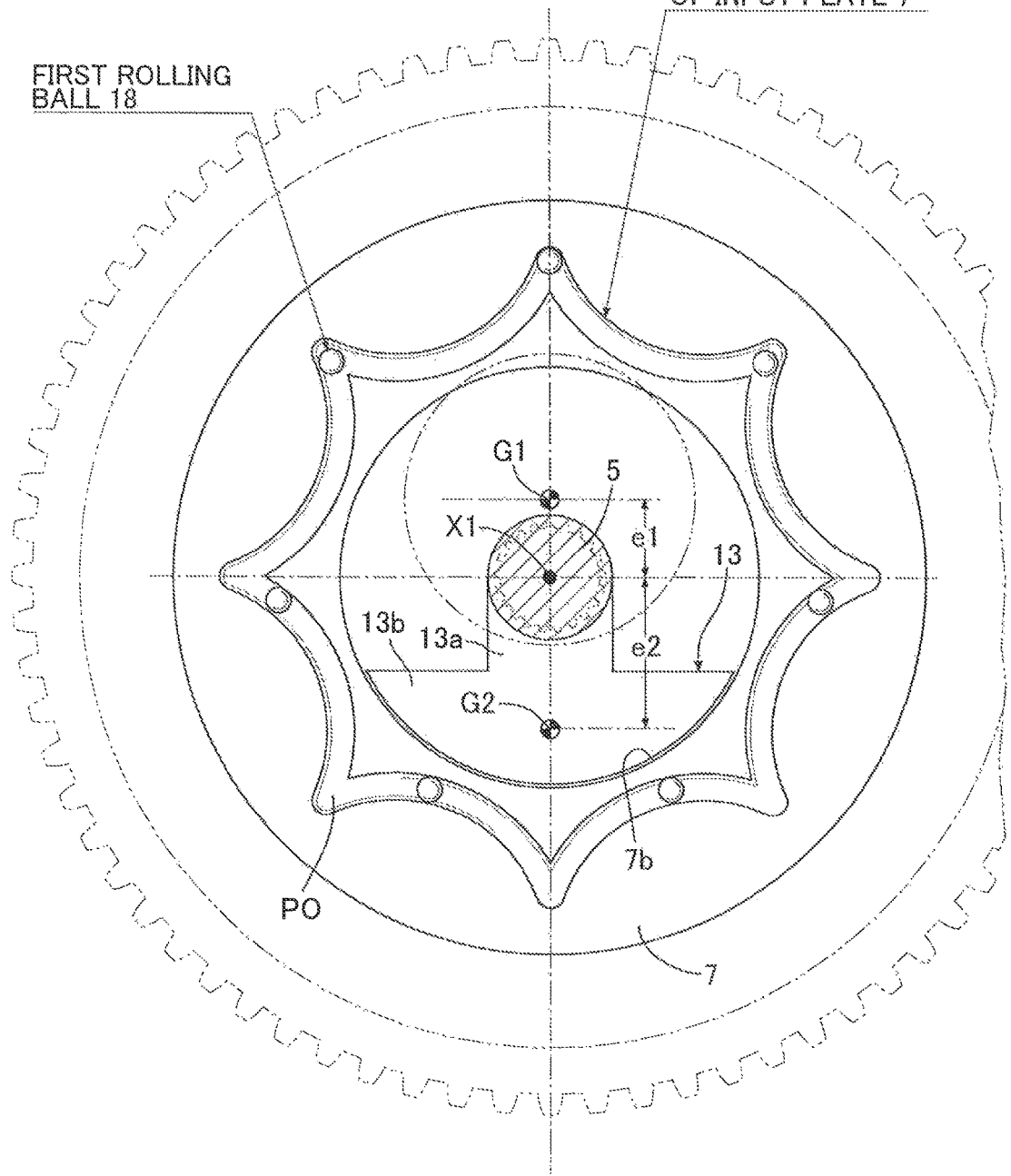
FIG. 4 is a sectional view from arrowed line 4-4 in FIG. 1. (first embodiment)
Figure 5:
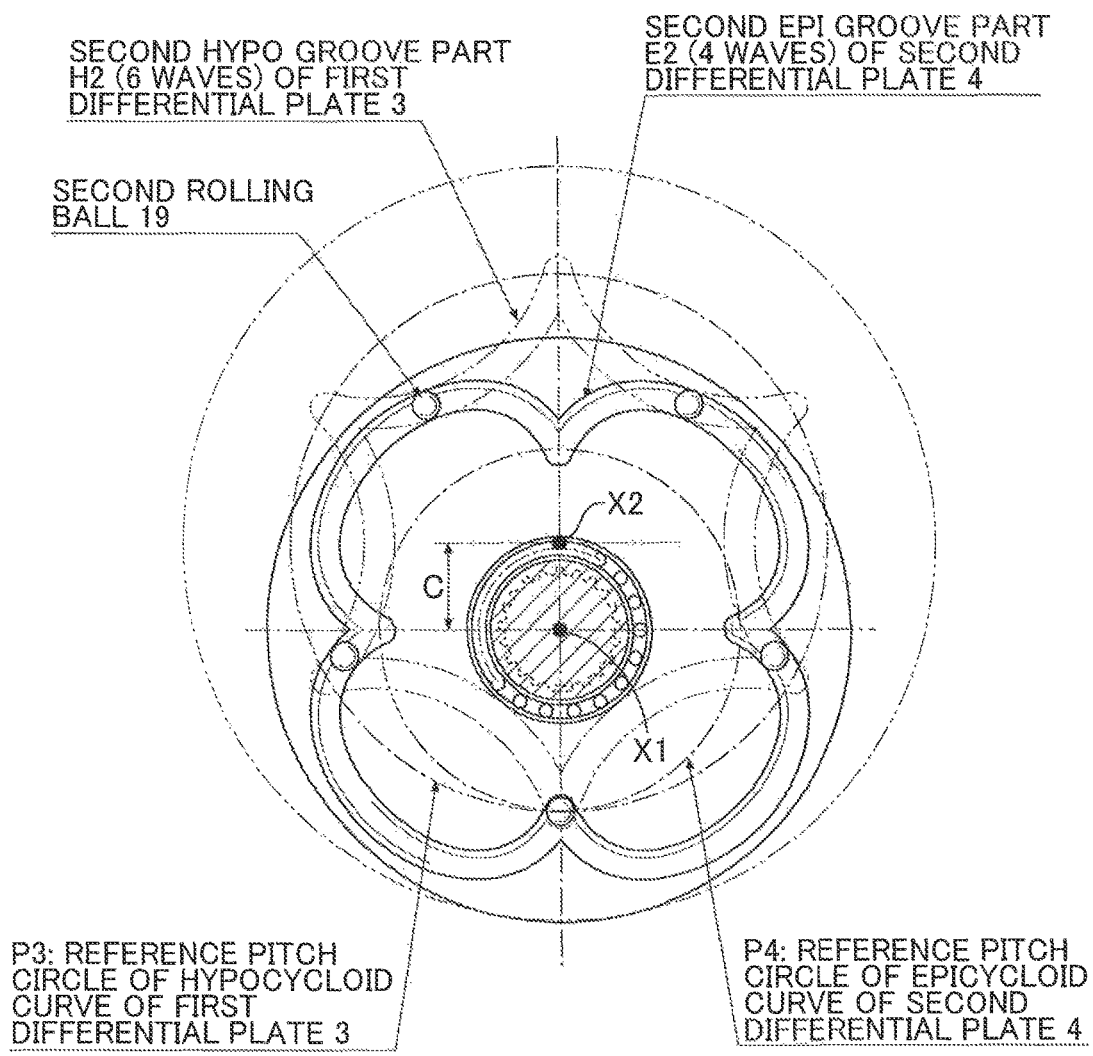
FIG. 5 is a sectional view from arrowed line 5-5 in FIG. 1. (first embodiment)

Referring in addition to FIG. 4, which is a sectional view from arrowed line 4-4 in FIG. 1, a cylindrical cutout portion 7b is formed in a middle part of one side face 7a of the input plate 7 facing the interior of the differential case 2, and a balancer 13 linked to the center shaft portion 5a of the eccentric shaft 5 is disposed within the cutout portion 7b. The balancer 13 has an arm portion 13a that extends radially outwardly in a direction opposite to the direction in which the eccentric shaft portion 5b projects from the outer periphery of the center shaft portion 5a of the eccentric shaft 5 so as to rotate around the first rotational axis X1 with a phase that is displaced by 180 degrees from the phase of a center of gravity G1 of the first differential plate 3 revolving around the first rotational axis X1, and a weight portion 13b that is connected to the extremity of the arm portion 13a. The outer periphery of the weight portion 13b is formed into an arc shape along the inner periphery of the cutout portion 7b and is adjacent to the inner periphery of the cutout portion 7b. This enables the weight portion 13b to be disposed at a positon that is furthest from the center shaft portion 5a within the cutout portion 7b without being in contact with the inner periphery of the cutout portion 7b.

The balancer 13 is desirably formed integrally with the center shaft portion 5a of the eccentric shaft 5, but may be formed as a separate body. Furthermore, it is desirable that the amount of imbalance of the first differential plate 3 and the amount of imbalance of the balancer 13 are equal, but since it is difficult to make them completely equal, knowledge gained from experience shows that the difference between the amount of imbalance of the first differential plate 3 and the amount of imbalance of the balancer 13 should be made less than 1/100 of the amount of imbalance of the first differential plate 3. That is, when the mass of the first differential plate 3 is M1, the mass of the balancer 13 is M2, and as shown in FIG. 4 the distance from the first rotational axis X1 to the center of gravity G1 of the first differential plate 3 when viewed on a projection plane orthogonal to the first rotational axis X1 (the position of the center of gravity G1 on the projection plane usually substantially coincides with the position of the second rotational axis X2) is e1 and the distance from the first rotational axis X1 to the center of gravity of the balancer 13 is e2, satisfying the relationship $$|M1 \times e1 - M2 \times e2| < M1 \times e1/100$$

enables the mass M2 and the amount of eccentricity e2 of the balancer 13 to be optimized with respect to the mass M1 and the amount of eccentricity e1 of the first differential plate 3.

Furthermore, a ring gear 14 is fixed to the outer periphery of the input plate 7 by means of a bolt B2 so as to be offset toward the cover 9 side, and by making the ring gear 14 mesh with an output gear of a transmission device, which is not illustrated, when the output gear rotates the differential case 2 receives the rotation and rotates around the first rotational axis X1.

The outer periphery of a first output shaft 15 and the outer periphery of a second output shaft 16 respectively are spline fitted into the inner periphery, on the first shaft 6 side, of the center shaft portion 5a of the eccentric shaft 5 and the inner periphery, on the second shaft 8 side, of the center shaft 4b of the second differential plate 4 in order for the first output shaft 15 and the second output shaft 16 to rotate with the center shaft portion 5a and the center shaft 4b around the first rotational axis X1. These first and second output shafts 15 and 16 extend leftward and rightward respectively of the differential case 2 and are connected to automobile driven wheels, which are not illustrated. Furthermore, oil seals 17 and 17' are disposed between the first and second output shafts 15 and 16 and the transmission case 1 to thus prevent oil within the transmission case 1 from flowing to the outside.

Figure 3:
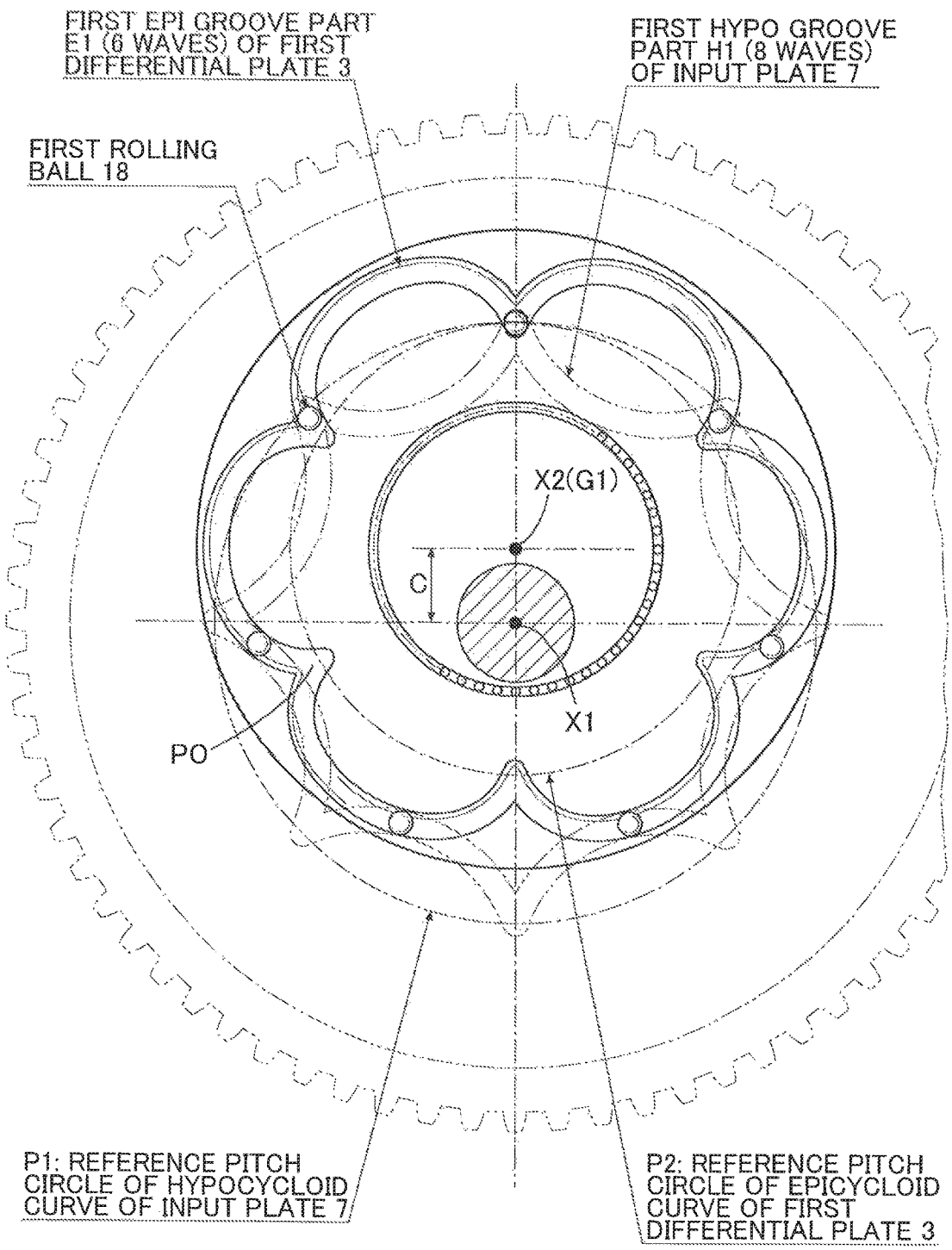
FIG. 3 is a sectional view from arrowed line 3-3 in FIG. 1. (first embodiment)

As shown in FIG. 2 and in FIG. 3, which is a sectional view from arrowed line 3-3 in FIG. 1, formed in the one side face 7a of the input plate 7, which opposes the first differential plate 3, is a first hypo groove part H1 extending in the peripheral direction along the hypocycloid curve of a first wave number Z1, and formed in one side face 3a of the first differential plate 3 opposing the input plate 7 is a first epi groove part E1 extending in the peripheral direction along the epicycloid curve of a second wave number Z2, a plurality of first rolling balls 18 being held between these two groove parts H1 and E1 in an area where the two groove parts overlap one on another. Similarly, as shown in the schematic diagram of FIG. 2 and in FIG. 5, which is a sectional view from arrowed line 5-5 in FIG. 1, formed in the other side face 3b of the first differential plate 3 opposing the second differential plate 4 is a second hypo groove part H2 extending in the peripheral direction along the hypocycloid curve of a third wave number Z3, and formed in one side face 4a of the second differential plate 4 opposing the first differential plate 3 is a second epi groove part E2 extending in the peripheral direction along the epicycloid curve of a fourth wave number Z4, a plurality of second rolling balls 19 being held between these two groove parts H2 and E2 in an area where the two groove parts overlap one on another.

The first and second hypo groove parts H1 and H2 may extend in the peripheral direction along the hypotrochoid curves of the first wave number Z1 and the third wave number Z3 and the first and second epi groove parts E1 and E2 may extend in the peripheral direction along the epitrochoid curves of the second wave number Z2 and the fourth wave number Z4. When these groove parts H1, H2, E1, and E2 extend in the peripheral direction along the trochoid curve, the trochoid coefficient of the first hypo groove part H1 and the first epi groove part E1 may be different from the trochoid coefficient of the second hypo groove part H2 and the second epi groove part E2.

When the first output shaft 15 is rotated in a state in which the differential case 2 is fixed, the eccentric shaft portion 5b rotates due to rotation of the center shaft portion 5a of the eccentric shaft 5, and rotates the first differential plate 3 around the first rotational axis X1, but in this process since the input plate 7 of the differential case 2 is fixed and the plurality of first rolling balls 18 are held between the first hypo groove part H1 formed in the one side face 7a of the input plate 7 and the first epi groove part E1 formed in the one side face 3a of the first differential plate 3, the first differential plate 3 revolves around the first rotational axis X1 while spinning around the second rotational axis X2 of the eccentric shaft portion 5b. In this process, since the plurality of second rolling balls 19 are held between the second hypo groove part H2 formed in the other side face 3b of the first differential plate 3 and the second epi groove part E2 formed in the one side face 4a of the second differential plate 4, the second differential plate 4 rotates around the first rotational axis X1 in association with the spinning and revolving of the first differential plate 3, and this causes the first and second output shafts 15 and 16 to rotate at different rotational speeds, but since the first to fourth wave numbers Z1 to Z4 are such that Z1=8, Z2=Z3=6, and Z4=4, or Z1=Z4=6, Z2=4, and Z3=8, the reduction ratio when the rotation of the first output shaft 15 is transmitted to the second output shaft 16 is −1 in both cases. Because of this, when the first output shaft 15 is rotated n times, the second output shaft 16 rotates in the reverse direction n times, when in this state the input plate 7 of the differential case 2 is rotated by applying rotational power from the transmission device, the first output shaft 15 rotates at a rotational speed that is larger than the rotational speed of the input plate 7 only by n, the second output shaft 16 rotates at a rotational speed that is smaller than the rotational speed of the input plate 7 only by n, and it is thus possible to realize equal differential rotation in which the amount of increase in rotational speed of one output shaft is made equal to the amount of decrease in rotational speed of the other output shaft. In addition, when there is no differential rotation between the first and second output shafts 15 and 16, the rotational speed of the first and second output shafts 15 and 16 becomes equal to the rotational speed of the input plate 7, and since the first and second output shafts 15 and 16 rotate integrally with the input plate 7, when the first and second output shafts 15 and 16 are not given a difference in rotational speed, the first and second output shafts 15 and 16 can be rotated integrally with the input plate.

The reason why equal distribution of torque is possible by setting the first wave number Z1 to the fourth wave number Z4 as above is now explained for a case in which each of the groove parts H1, H2, E1, and E2 extend along the cycloid curve.

Figure 6:
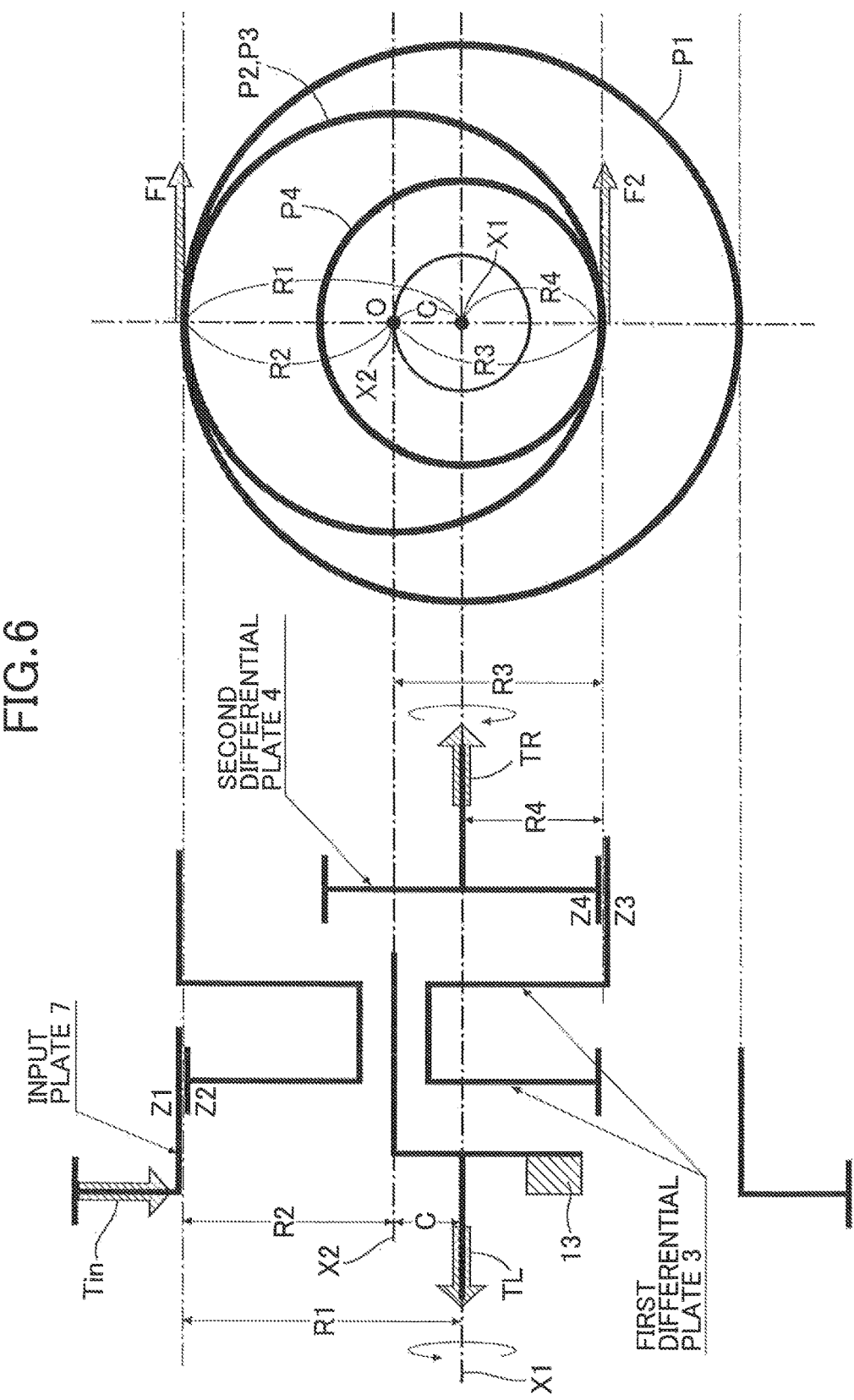
FIG. 6 is a skeleton diagram of the differential device of FIG. 1. (first embodiment)
Figure 7:
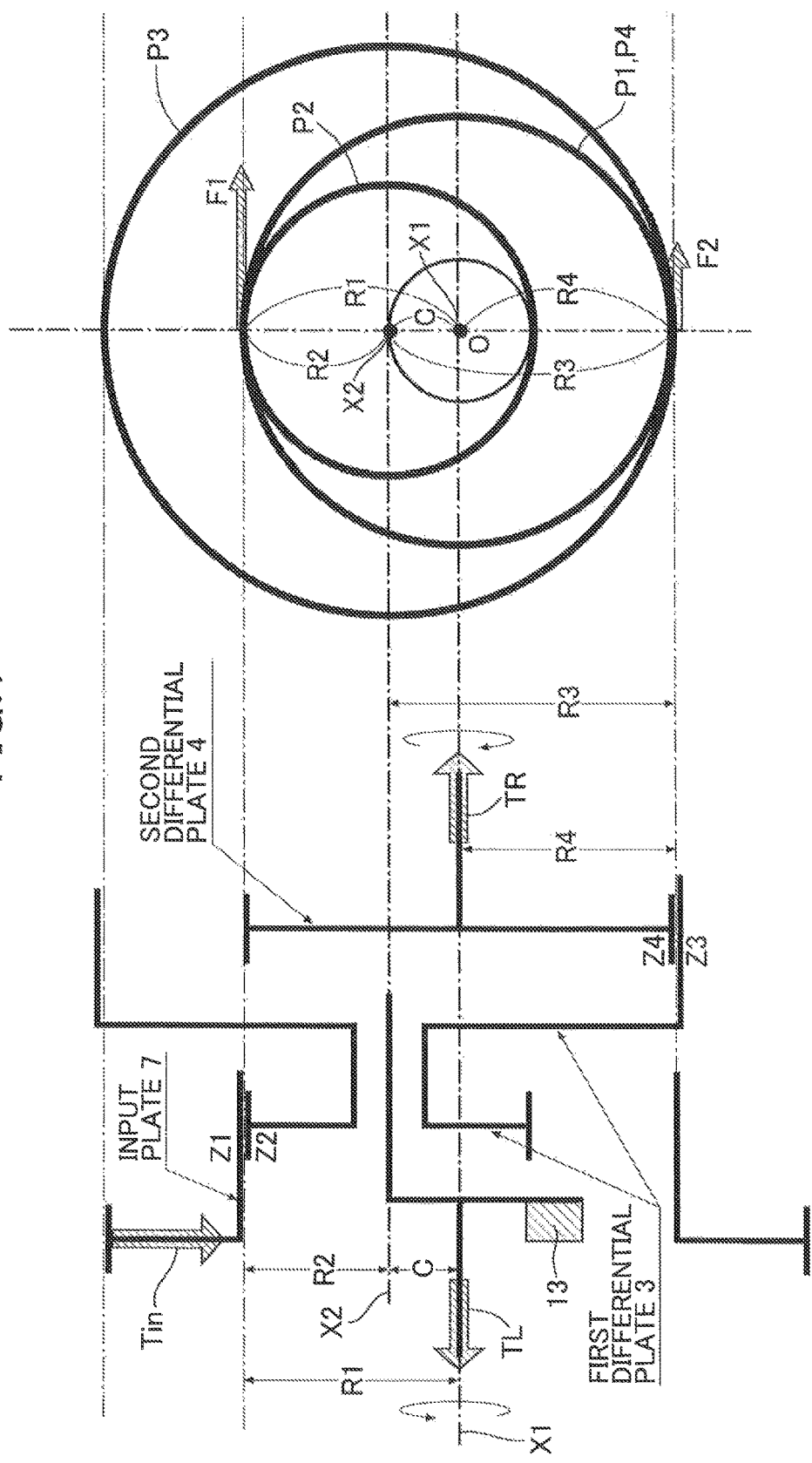
FIG. 7 is a skeleton diagram of the differential device related to the first embodiment of the present invention when $Z1=Z4=6$, $Z2=4$, and $Z3=8$. (first embodiment)

FIG. 6 shows a skeleton diagram of the first embodiment of the present invention when Z1=8, Z2=Z3=6, and Z4=4, and FIG. 7 shows a skeleton diagram of the first embodiment of the present invention when Z1=Z4=6, Z2=4, and Z3=8, each groove part being shown as a reference pitch circle that is equivalent thereto for convenience of explanation.

Considering that values for Z1 to Z4 in FIG. 6 and FIG. 7 have not yet been determined to be the above values, the reason why equal distribution of torque becomes possible by determining these values such that Z1=8, Z2=Z3=6, and Z4=4 or Z1=Z4=6, Z2=4, and Z3=8 is explained as follows.

Now, in FIG. 6 or FIG. 7 the radius of a reference pitch circle P1 of the hypocycloid curve of the one side face 7a of the input plate 7 is defined as R1, the radius of a reference pitch circle P2 of the epicycloid curve of the one side face 3a of the first differential plate 3 opposing the above is defined as R2, the radius of a reference pitch circle P3 of the hypocycloid curve of the other side face 3b of the first differential plate 3 is defined as R3, the radius of a reference pitch circle P4 of the epicycloid curve of the one side face 4a of the second differential plate 4 opposing the above is defined a R4, and the amount of eccentricity of the first differential plate 3 with respect to the input plate 7 (or the first and second output shafts 15 and 16) is defined as C.

In FIG. 6 or FIG. 7, for a torque Tin that is applied to the input plate 7 from the transmission device, the torque Tin causes a force F1 to act on a region of contact between the reference pitch circle P1 and the reference pitch circle P2 and a force F2 to act on a region of contact between the reference pitch circle P3 and the reference pitch circle P4; if these forces F1 and F2 causes a torque TL to be applied to the first output shaft 15 and a torque TR to be applied to the second output shaft 16, then $$Tin = F1 \cdot R1 \qquad (1)$$

$$TR = F2 \cdot R4 \qquad (2)$$

hold, and from the moment balance of the planetary mechanism, $$Tin = TL + TR \qquad (3)$$

holds.

Here, since in order to achieve equal distribution of torque it is necessary that $$TL = TR \qquad (4),$$

then from equations (3) and (4)

$$Tin = 2TR \qquad (5)$$

holds.

Furthermore, from the balance of moment in the first differential plate, $$F1 \cdot R2 = F2 \cdot R3 \qquad (6)$$

holds, and since equation (6) can be converted to $$F2 = (F1 \cdot R2)/R3 \qquad (7),$$

from equations (2) and (7)

$$TR = (F1 \cdot R2 \cdot R4)/R3 \qquad (8)$$

can be obtained.

If equations (1) and (8) are substituted for both sides of equation (5) to thus give $$F1 \cdot R1 = 2\{(F1 \cdot R2 \cdot R4)/R3\} \qquad (9),$$

and after both sides of equation (9) are divided by F1, both sides are multiplied by R3, equation (9) can be converted to $$R1 \cdot R3 = 2(R2 \cdot R4) \qquad (10).$$

As is clear from FIG. 6, since $$R1 = R2 + C \qquad (11)$$

$$R3 = R4 + C \qquad (12),$$

putting equations (11) and (12) into equation (10) gives $$(R2+C)(R4+C) = 2(R2 \cdot R4) \qquad (13),$$

which is converted to give $$R1 \cdot R4 - R2 + C - R4 \cdot C = C^2 \qquad (14).$$

That is, in order to achieve an equal distribution of torque in FIG. 6 or FIG. 7, it is necessary for equation (14) to hold. In the case of the cycloid curve, since the trochoid coefficient, which is describe later, is 1, unless R1 to R4 are integers, setting of the number of teeth is impossible. Therefore, C, R2, and R4 must be integers that satisfy equation (14).

Here, for simplicity, if the amount of eccentricity C is C=1, equation (14) becomes $$R2 \cdot R4 - R2 - R4 = 1 \qquad (15),$$

and the only two patterns of solutions of integers of R2 and R4 that satisfy equation (15) are R2=3, R4=2 (pattern 1) and
R2=2, R4=3 (pattern 2).

Here, if R2=3 and R4=2 as in pattern 1, from equations (11) and (12) R1=4 and R3=3, and if R2=2 and R4=3 as in pattern 2, from the same equations R1=3 and R3=4. Setting R1 to R4 to these values makes F1=F2 from equation (6), and since from this and equations (1) and (2) equation (5) holds, from equation (5) and equation (3) above, equation (4), that is, TL=TR, can be satisfied.

Z1=8, Z2=Z3=6, and Z4=4 when as in pattern 1 R1=4, R2=R3=3, and R4=2, and Z1=Z4=6, Z2=4, and Z3=8 when as in pattern 2 R1=R4=3, R2=2, and R3=4 are now explained for a case in which each of the groove parts H1, H2, E1, and E2 extends along the cycloid curve.

In general, the relationship m=d/Z holds between the wave number Z, the reference pitch circle diameter d, and the module m, and the relationship C=α·m holds between the amount of eccentricity C, the module m, and the trochoid coefficient α, and since in the cycloid curve the trochoid coefficient α is 1, C=1·m=m.

Therefore, from these relationships, in the case of the cycloid curve, $$C = d/Z \qquad (16)$$

is obtained, but since C=1, 1=d/Z, that is, $$1 = 2R1/Z1 = 2R2/Z2 = 2R3/Z3 = 2R4/Z4 \qquad (17)$$

holds.

Therefore, putting R1=4, R2=R3=3, and R4=2 into equation (17) gives Z1=8, Z2=Z3=6, and Z4=4, and putting in R1=R4=3, R2=2, and R4=4 gives Z1=Z4=6, Z2=4, and Z3=8, therefore making it possible to achieve an equal distribution of torque by setting Z1=8, Z2=Z3=6, and Z4=4 or Z1=Z4=6, Z2=4, and Z3=8 to thus satisfy equation (15).

In addition, even when in equation (14) C is an integer k of 2 or greater, since the integer solutions of R2 and R4 that satisfy $R2 \cdot R4 - R2 \cdot k - R4 \cdot k = k^2$ have only the two patterns R2=3k, R4=2k (pattern 1)
R2=2k, R4=3k (pattern 2), in the case of pattern 1, R1=4k, R2=R3=3k, and R4=2k, and in the case of pattern 2, R1=R4=3k, R2=2k, and R3=4k. However, in this case C in equation (16) also becomes k and since equation (17) becomes k=2R1/Z1=2R2/Z2=2R3/Z3=2R4/Z4, even if C is an integer of 2 or greater, for pattern 1 it still gives Z1=8, Z2=Z3=6, and Z4=4, and for pattern 2, Z1=Z4=6, Z2=4, and Z3=8.

A case in which each of the groove parts H1, H2, E1, and E2 extends along the trochoid curve is now explained. Equation (17) can be converted as follows.

$$1=2R1\cdot\alpha1/Z1=2R2\cdot\alpha1/Z2=2R3\cdot\alpha2/Z3=2R4\cdot\alpha2/Z4 \quad (18)$$

Here, $\alpha1$ denotes the trochoid coefficient for the reference pitch circles P1 and P2, and $\alpha2$ denotes the trochoid coefficient for the reference pitch circles P3 and P4.

Therefore, if a given value in the range of 0 to 1 is set for each of the trochoid coefficients $\alpha1$ and $\alpha2$, it is possible to design the radii R1, R2, R3, and R4 of the reference pitch circles so as to be an optimum size for the strength and dimensions while ensuring that the number of teeth Z is an integer value and the amount of eccentricity C is a common value. With regard to the number of teeth, as in the case of the cycloid curve, Z1=8, Z2=Z3=6, and Z4=4 if it is pattern 1 and Z1=Z4=6, Z2=4, and Z3=8 if it is pattern 2 can also be obtained in the case of the trochoid curve.

The operation of the first embodiment is now explained.

The cycloid reduction mechanism or trochoid reduction mechanism forming the differential device includes the first differential plate 3 which is disposed so as to be adjacent to one side of the input plate 7 rotating around the first rotational axis X1, the second differential plate 4 disposed so as to be adjacent to one side of the first differential plate 3 that is opposite to the input plate 7, and the eccentric shaft 5 supporting the first differential plate 3 so that it can rotate around the second rotational axis X2, which is eccentric from the first rotational axis X1. The eccentric shaft 5 is connected to the first output shaft 15 so that they can rotate as a unit, the second differential plate 4 is connected to the second output shaft 16 so that they can rotate as a unit, the first hypo groove part H1 extending in the peripheral direction along the hypocycloid curve or the hypotrochoid curve of the first wave number Z1 is formed in the one side face 7a, opposing the first differential plate 3, of the input plate 7, the first epi groove part E1 extending in the peripheral direction along the epicycloid curve or the epitrochoid curve of the second wave number Z2 is formed in the one side face 3a, opposing the input plate 7, of the first differential plate 3, the plurality of first rolling balls 18 are held between these two groove parts H1 and E1 in an area where the two groove parts H1 and E1 overlap one on another, the second hypo groove part H2 extending in the peripheral direction along the hypocycloid curve or the hypotrochoid curve of the third wave number Z3 is formed in the other side face 3b, opposing the second differential plate 4, of the first differential plate 3, the second epi groove part E2 extending in the peripheral direction along the epicycloid curve or the epitrochoid curve of the fourth wave number Z4 is formed in the one side face 4a, opposing the first differential plate 3, of the second differential plate 4, and the plurality of second rolling balls 19 are held between these two groove parts H2 and E2 in an area where the two groove parts H2 and E2 overlap one on another; with regard to the first to fourth wave numbers, the first wave number Z1 is 8, the second wave number Z2 and the third wave number Z3 are both 6, and the fourth wave number Z4 is 4 or the first wave number Z1 and the fourth wave number Z4 are both 6, the second wave number Z2 is 4, and the third wave number Z3 is 8. Therefore, when the input plate 7 is rotated, in the case in which the first and second output shafts 15 and 16 are not given a difference in rotational speed, the first and second output shafts 15 and 16 can be rotated integrally with the input plate 7, and in the case in which the first and second output shafts 15 and 16 are given a difference in rotational speed, a differential mechanism that enables equal distribution of torque and equal differential rotation in which the amount of increase in rotational speed of one of the output shafts is made equal to the amount of decrease in rotational speed of the other output shaft can be achieved without using a bevel gear or a center plate with radial elongated holes. Because of this, the differential mechanism can be made compact by minimizing the axial length thereof, there is no occurrence of a teeth-ratting noise as in the case of the use of a bevel gear, it is unnecessary to employ a center plate with radial elongated holes, which causes sliding of the rolling ball, and it is therefore possible to efficiently transmit power from the input plate 7 to the first and second output shafts 15 and 16. Furthermore, since the first and second rolling balls 18 and 19 transmit the torque while dispersing it between the first hypo groove part H1 and the first epi groove part E1 and between the second hypo groove part H2 and the second epi groove part E2, it is possible to reduce the torque that each of the rolling balls 18 and 19 transmits, thus improving the strength and durability of the rolling balls 18 and 19.

Furthermore, when the first and second hypo groove parts H1 and H2 and the first and second epi groove parts E1 and E2 extend in the peripheral direction along the trochoid curve, the trochoid coefficient of the first hypo groove part H1 and the first epi groove part E1 may be different from the trochoid coefficient of the second hypo groove part H2 and the second epi groove part E2. For example, the trochoid coefficient of the second rolling ball 19 side for which the number of rolling balls are small is made small to thus increase the pitch circle radius and the ball diameter, and this enables the load borne by each ball to be reduced, thereby enabling an optimum design to be achieved while taking into consideration strength and lightness of weight.

Moreover, in this arrangement, since the cylindrical cutout portion 7b is formed in a middle part of the one side face 7a of the input plate 7, and the balancer 13 rotating around the first rotational axis X1 with a phase that is displaced by 180 degrees from the phase of the center of gravity of the first differential plate 3 rotating around the first rotational axis X1 is disposed within the cutout portion 7b, it is possible to counterbalance unbalanced rotation of the center of gravity of the first differential plate 3 rotating around the first output shaft 15 by means of the balancer 13, thereby suppressing effectively the occurrence of vibration due to the centrifugal force caused by the amount of imbalance of the first differential plate 3 and the accompanying noise. Furthermore, disposing the balancer 13 within the cutout portion 7b of the input plate 7 enables the balancer 13 to be disposed in a compact manner between the first differential plate 3 and the input plate 7, and it is possible to reduce the material of an unnecessary portion of the input plate 7 by means of the cutout portion 7b, thereby reducing the cost of the differential device D and lightening the weight of the differential device D.

Furthermore, since the differential case 2 supported on the transmission case 1 of an automobile so that it can rotate around the first rotational axis X1 is formed from the input plate 7 and the cover 9, which is fixed to the input plate 7 and covers the first differential plate 3, the eccentric shaft 5, and the second differential plate 4, a two-stage type transmission mechanism employing the cycloid reduction mechanism or the trochoid reduction mechanism can be suitably used as a differential device that allows differential rotation of left and right or front and rear driven wheels of the automobile. Moreover, since the input plate 7 forms part of the differential case 2, it is possible to reduce the number of components, and since the first and second differential plates 3 and 4 and the eccentric shaft 5 are housed within the differential case 2, it is possible to form an automobile differential device having such a new mechanism in a compact manner without greatly changing the arrangement of a conventional differential device.

Furthermore, the eccentric shaft 5 has the center shaft portion 5a rotating around the first rotational axis X1 and the eccentric shaft portion 5b projecting radially from the center shaft portion 5a and supporting the first differential plate 3 so that it can rotate around the second rotational axis X2, the center shaft portion 5a extends through the middle part of the input plate 7 and is connected to the first output shaft 15, the second differential plate 4 has the center shaft 4b rotating around the first rotational axis X1, and the center shaft 4b extends through the middle part of the cover 9 and is connected to second output shaft 16, therefore making it possible to simply assemble the eccentric shaft 5, the first differential plate 3, and the second differential plate 4 within the differential case 2 merely by supporting the first differential plate 3 on the eccentric shaft portion 5b of the eccentric shaft 5 having the center shaft portion 5a extending through the middle part of the input plate 7 and by disposing the second differential plate 4 having the center shaft 4b extending through the middle part of the cover 9 outside the first differential plate 3.

Moreover, since the input plate 7 and the cover 9 have the hollow cylindrical first and second shafts 6 and 8 rotatably supported on the transmission case 1 on the first rotational axis X1, the center shaft portion 5a of the eccentric shaft 5 is rotatably supported on the inner periphery of the first shaft 6 via the first bearing 11, the center shaft 4b of the second differential plate 4 is rotatably supported on the inner periphery of the second shaft 8 via the second bearing 11', and the center shaft portion 5a of the eccentric shaft 5 on the side opposite to the first shaft 6 is fitted via the third bearing 11" into the circular recess portion 4c formed in the one side face 4a of the second differential plate 4, it is possible to ensure smooth relative rotation of the eccentric shaft 5 and the second differential plate 4 within the differential case 2 merely by means of the first to third bearings 11 to 11".

Moreover, since the cutout portion 7b of the input plate 7 is formed into a cylindrical shape, and the balancer 13 linked to the eccentric shaft 5 is disposed within the cutout portion 7b so as to rotate around the first rotational axis X1 with a phase that is displaced by 180 degrees from the phase of the center of gravity G1 of the first differential plate 3 rotating around the first rotational axis X1, it is possible to counterbalance the unbalanced rotation of the first differential plate 3 rotating around first rotational axis X1 by means of the balancer 13, thereby suppressing effectively the occurrence of vibration due to the centrifugal force caused by the amount of imbalance of the first differential plate 3 and the accompanying noise. Furthermore, since the balancer 13 is housed within the cutout portion 7b of the input plate 7 forming part of the differential case 2 and is disposed within the differential case 2, it is possible to compactly dispose the balancer 13 at an optimum position within the differential case 2 at which there is no interference with another member and prevent the differential case 2 from increasing in dimensions.

Moreover, since when the mass of the first differential plate 3 is M1, the mass of the balancer 13 is M2, the distance from the first rotational axis X1 to the center of gravity G1 of the first differential plate 3 when viewed on a projection plane orthogonal to the axis of the first output shaft 15 is e1, and the distance from the first rotational axis X1 to the center of gravity G2 of the balancer 13 is e2, $|M1 \times e1 - M2 \times e2| < M1 \times e1/100$ is satisfied, it is possible to make the amount of imbalance of the first differential plate 3 and the amount of imbalance of the balancer 13 substantially equal, thereby optimizing the mass and the amount of eccentricity of the balancer 13 with respect to the mass and the amount of eccentricity of the first differential plate 3.

Furthermore, since the eccentric shaft 5 has the center shaft portion 5a rotating around the first rotational axis X1 and the eccentric shaft portion 5b projecting radially from the center shaft portion 5a and supporting the first differential plate 3 so that it can rotate around the second rotational axis X2, the balancer 13 has the arm portion 13a extending radially outwardly from the outer periphery of the center shaft portion 5a of the eccentric shaft 5 in a direction opposite to the direction in which the eccentric shaft portion 5b projects and the weight portion 13b connected to the extremity of the arm portion 13a, and the outer periphery of the weight portion 13b is formed into an arc shape along the inner periphery of the cutout portion 7b and is adjacent to the inner periphery of the of the cutout portion 7b, it is possible to make the weight portion 13b of the balancer 13 as close to the inner peripheral face of the cutout portion 7b as possible, thus separating the center of gravity of the balancer 13 from the rotational center of the balancer 13 and thereby suppressing any increase in the weight due to the balancer 13.

Moreover, since the differential case 2 supported on the transmission case 1 of the automobile so that it can rotate around the first rotational axis X1 is formed from the input plate 7 and the cover 9 fixed to the input plate 7 and covering the first differential plate 3, the eccentric shaft 5, the balancer 13, and the second differential plate 4, a two-stage type transmission mechanism employing the cycloid reduction mechanism can be suitably used as a differential device that allows differential rotation of left and right or front and rear driven wheels of the automobile, and since the input plate 7 forms part of the differential case 2, it is possible to reduce the number of components. Furthermore, due to the balancer 13 being disposed in the cutout portion 7b of the input plate 7 the first and second differential plates 3 and 4 and the eccentric shaft 5 can be housed compactly within the differential case 2, and it is therefore possible to form an automobile differential device with such a new mechanism without greatly changing the arrangement of the conventional differential device.

Moreover, since the input plate 7 and the cover 9 have the hollow cylindrical first and second shafts 6 and 8 rotatably supported on the transmission case 1 on the first rotational axis X1, the center shaft portion 5a of the eccentric shaft 5 is rotatably supported on the inner periphery of the first shaft 6 via the first bearing 11, the center shaft 4b of the second differential plate 4 is rotatably supported on the inner periphery of the second shaft 8 via the second bearing 11', and the center shaft portion 5a of the eccentric shaft 5 on the side opposite to the first shaft 6 is fitted into the circular recess portion 4c formed in the one side face of the second differential plate 4 via the third bearing 11", it is possible to ensure smooth relative rotation of the eccentric shaft 5 and the second differential plate 4 within the differential case 2 by means of only the first to third bearings 11 to 11", and the operation of assembling the cycloid reduction mechanism within the differential case 2 also becomes easy.

Furthermore, in the case of forming the balancer 13 integrally with the center shaft portion 5a of the eccentric shaft 5, since there is no case in which the positional relationship between the balancer 13 and the eccentric shaft 5 changes, it is always possible to rotate the balancer 13 with a phase that is displaced by 180 degrees from the center of gravity of the first differential plate 3.

Second Embodiment

A second embodiment in which the differential device of the present invention is used as an automobile differential device is now explained by reference to FIG. 8.

Figure 8:
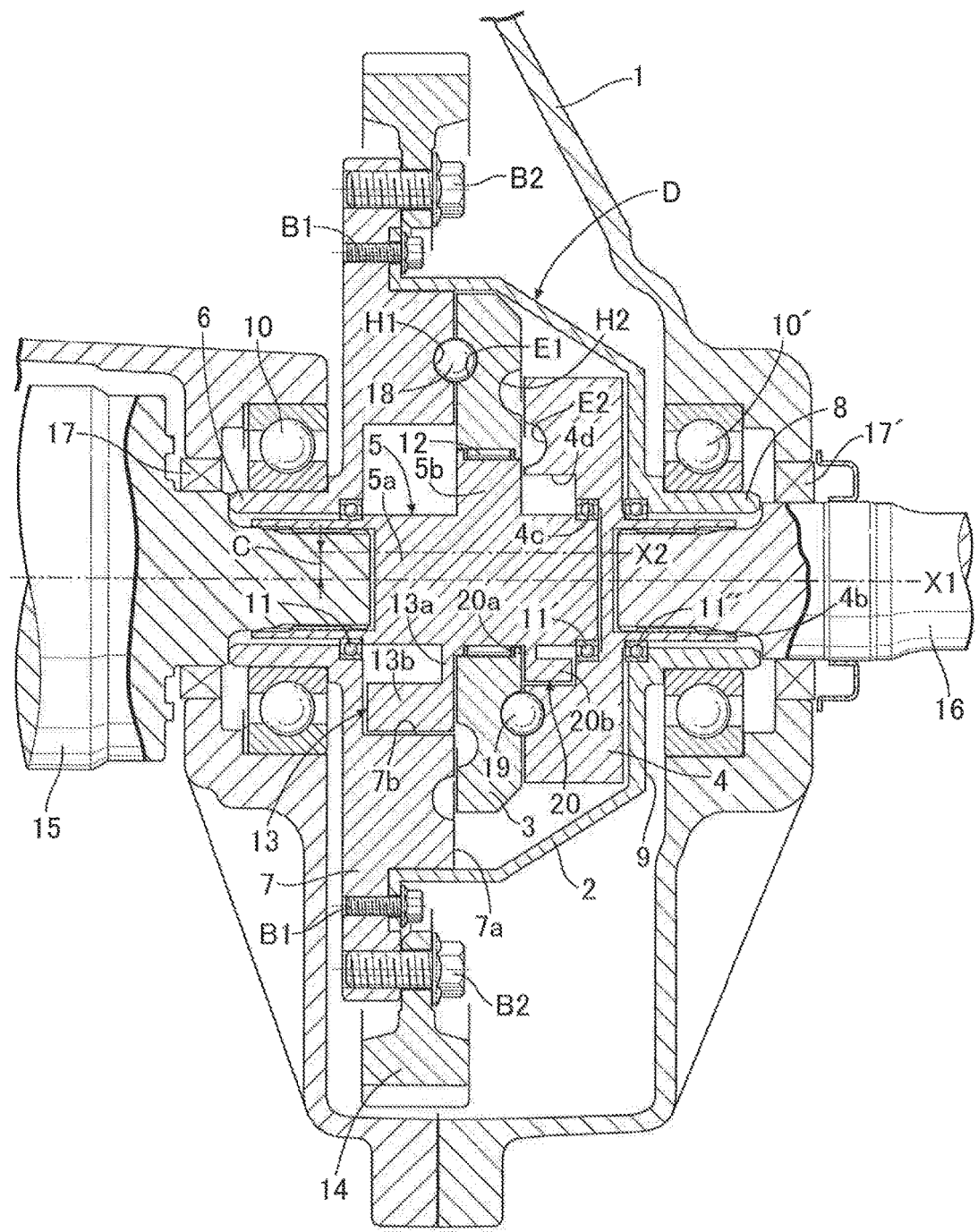
FIG. 8 is a sectional front view of a differential device related to a second embodiment of the present invention. (second embodiment)

The second embodiment described in FIG. 8 is one in which an auxiliary balancer 20 is added to the differential device of the first embodiment, and is different from the differential device of the first embodiment only in respect of a cylindrical auxiliary cutout portion 4d opposing the cutout portion 7b of the input plate 7 with the first differential plate 3 sandwiched therebetween being formed in a middle part of the one side face 4a of the second differential plate 4, and the auxiliary balancer 20 linked to the eccentric shaft 5 being disposed within the auxiliary cutout portion 4d so as to revolve around the first rotational axis X1 with a phase that is displaced by 180 degrees from the phase of the center of gravity of the first differential plate 3 rotating around the first rotational axis X1, the remaining aspects being the same as those of the differential device of the first embodiment; in FIG. 8 parts that are the same as those in the first embodiment are denoted by the same reference numerals and symbols, the explanation thereof being omitted.

In FIG. 8, formed in a middle part of the one side face 4a of the second differential plate 4 is the auxiliary cutout portion 4d described above, and disposed within the auxiliary cutout portion 4d is the auxiliary balancer 20 linked to the center shaft portion 5a of the eccentric shaft 5 on the second differential plate 4 side so as to rotate around the first rotational axis X1 with a phase that is displaced by 180 degrees from the phase of the center of gravity G1 of the first differential plate 3. The amount of imbalance of the first differential plate 3 is desirably the same as the total amount of imbalance of the balancer 13 and the auxiliary balancer 20, but since it is difficult to make them completely the same, knowledge gained from experience shows that the difference between the amount of imbalance of the first differential plate 3 and the total amount of imbalance of the balancer 13 and the auxiliary balancer 20 should be less than $1/100$ of the amount of imbalance of the first differential plate 3. That is, when the mass of the first differential plate 3 is M1, the mass of the balancer 13 is M2, the mass of the auxiliary balancer 20 is M3, the distance from the first rotational axis X1 to the center of gravity G1 of the first differential plate 3 when viewed on a projection plane orthogonal to the axis of the first output shaft 15 is e1, the distance from the first rotational axis X1 to the center of gravity G2 of the balancer 13 is e2, and the distance from the first rotational axis X1 to the center of gravity G3 of the auxiliary balancer 20 (G3 is not illustrated) is e3, making $$|M1 \times e1 - (M2 \times e2 + M3 \times e3)| < M1 \times e1/100$$

enables the amount of imbalance of the first differential plate 3 to be made substantially the same as the total amount of imbalance of the balancer 13 and the auxiliary balancer 20, and it is possible to optimize the masses M2 and M3 and the amounts of eccentricity e2 and e3 of the balancer 13 and the auxiliary balancer 20 with respect to the mass M1 and the amount of eccentricity e1 of the first differential plate 3.

The auxiliary balancer 20 has substantially the same shape as that of the balancer 13, and has an arm portion 20a extending radially outwardly from the outer periphery of the center shaft portion 5a of the eccentric shaft 5 in a direction opposite to the direction in which the eccentric shaft portion 5b projects, and a weight portion 20b connected to the extremity of the arm portion 20a, and the outer periphery of the weight portion 20b is formed into an arc shape along the inner periphery of the auxiliary cutout portion 4d and is adjacent to the inner periphery of the auxiliary cutout portion 4d. This enables the weight portion 20b to be disposed at a position that is furthest from the first output shaft 15 within the auxiliary cutout portion 4d without making contact with the inner periphery of the auxiliary cutout portion 4d.

The operation of the second embodiment is now explained.

Since the circular auxiliary cutout portion 4d opposing the cutout portion 7b of the input plate 7 with the first differential plate 3 sandwiched therebetween is formed in the middle part of the one side face 4a of the second differential plate 4, and the auxiliary balancer 20 linked to the eccentric shaft 5 is disposed within the auxiliary cutout portion 4d so as to rotate around the first rotational axis X1 with a phase that is displaced by 180 degrees from the phase of the center of gravity of the first differential plate 3 rotating around the first rotational axis X1, it is possible to counterbalance the unbalanced rotation of the first differential plate 3 from the left and the right with good balance by means of the balancer 13 and the auxiliary balancer 20 disposed on opposite sides of the first differential plate 3, thus suppressing further effectively the occurrence of vibration due to the centrifugal force caused by the amount of imbalance of the first differential plate 3 as well as decreasing the mass of each of the balancer 13 and the auxiliary balancer 20 and making them compact.

Furthermore, since the difference between the amount of imbalance of the first differential plate 3 and the total amount of imbalance of the balancer 13 and the auxiliary balancer 20 is made less than $1/100$ of the amount of imbalance of the first differential plate 3, which is a small value, it is possible to make the amount of imbalance of the first differential plate 3 and the total amount of imbalance of the balancer 13 and the auxiliary balancer 20 substantially the same, and it is possible to optimize the masses M2 and M3 and the amounts of eccentricity e2 and e3 of the balancer 13 and the auxiliary balancer 20 with respect to the mass M1 and the amount of eccentricity e1 of the first differential plate 3.

Moreover, since the auxiliary balancer 20 has the arm portion 20a, which extends radially outwardly from the outer periphery of the center shaft portion 5a of the eccentric shaft 5 in a direction opposite to the direction in which the eccentric shaft portion 5b projects, and the weight portion 20b, which is connected to the extremity of the arm portion 20a, and the outer periphery of the weight portion 20b is formed into an arc shape along the inner periphery of the auxiliary cutout portion 4d and is adjacent to the inner periphery of the auxiliary cutout portion 4d, it is possible to make the weight portion 20b of the auxiliary balancer 20 as close to the inner peripheral face of the auxiliary cutout portion 4d as possible, thus enabling the center of gravity of the auxiliary balancer 20 to be separated from the rotational center of the auxiliary balancer 20 and thereby suppressing any increase in the weight due to the auxiliary balancer 20.

Furthermore, when the auxiliary balancer 20 is formed integrally with the center shaft portion 5a of the eccentric shaft 5, since the positional relationship in the peripheral direction between the auxiliary balancer 20 and the eccentric shaft 5 is not displaced, it is possible to always rotate the auxiliary balancer 20 with a phase that is displaced by 180 degrees from the phase of the center of gravity of the first differential plate 3.

Third Embodiment

Figure 9:
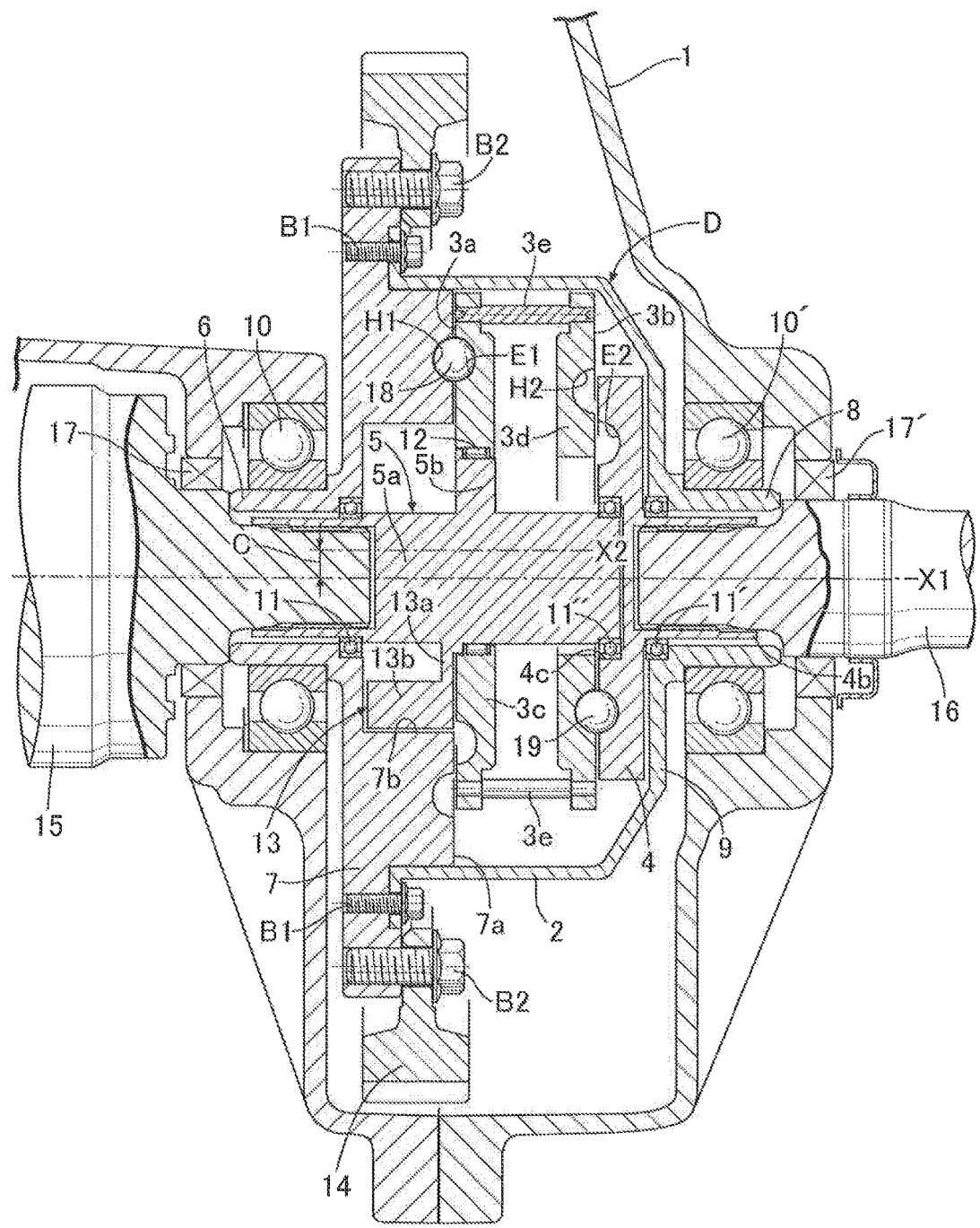
FIG. 9 is a sectional front view of a differential device related to a third embodiment of the present invention. (third embodiment)

A third embodiment of the present invention is now explained by reference to FIG. 9.

In the third embodiment, the first differential plate 3 in FIG. 1 is formed from a pair of rotating plates 3c and 3d linked via a linking member 3e so that they can rotate as a unit.

That is, in the third embodiment, one side face of the first rotating plate 3c opposes the one side face 7a of the input plate 7, one side face of the second rotating plate 3d opposes the one side face 4a of the second differential plate 4, and the other side face of the first rotating plate 3c and the other side face of the second rotating plate 3d are linked to each other across a gap via a plurality of the rod-shaped linking members 3e disposed on outer peripheral parts thereof at equal intervals in the peripheral direction. Furthermore, the first epi groove part E1 opposing the first hypo groove part H1 of the input plate 7 is formed in the one side face of the first rotating plate 3c, the second hypo groove part H2 opposing the second epi groove part E2 of the second differential plate 4 is formed in the one side face of the second rotating plate 3d, the plurality of first rolling bodies 18 are held between the two groove parts H1 and E1 in an area in which the two groove parts H1 and E1 overlap one on another, and the plurality of second rolling bodies 19 are held between the two groove parts H2 and E2 in an area in which the two groove parts H2 and E2 overlap one on another. The rest of the arrangement is the same as that of the first embodiment; in FIG. 9 parts corresponding to those of the first embodiment are denoted by the same reference numerals and symbols, duplication of the explanation being omitted. This third embodiment may be applied to the first differential plate 3 of the second embodiment.

The operation of the third embodiment is now explained.

In the third embodiment, since the first differential plate 3 is formed so as to include the pair of rotating plates 3c and 3d, which are linked to each other across a gap by means of the rod-shaped linking members 3e and can be rotated as a unit, the first differential plate 3 can be formed from the two separate rotating plates 3c and 3d. Because of this, for example, a production method in which the two rotating plates 3c and 3d each having a groove part in one side face are molded by forging, etc., and are then linked by means of the rod-shaped linking members 3e may be employed, and the groove parts E1 and H2 having excellent strength can be quickly and easily formed, thus improving the ease of the production operation. Furthermore, since the size of a face, opposing the input plate, and the size of a face, opposing the second differential plate, of the first differential plate 3 can be set independently from each other, even when the second wave number is 4 and the third wave number is 8, the degree of freedom in design improves.

Moreover, since a gap is formed between the two rotating plates 3c and 3d, the balancer 13 linked to the eccentric shaft 5 may be disposed in the gap instead of being disposed within the cutout portion 7b of the input plate 7.

First to third embodiments of the present invention are explained above, but the present invention may be modified in a variety of ways as long as the modifications do not depart from the spirit and scope thereof.

For example, in the first to third embodiments a balancer is used, but this balancer may be omitted.

Furthermore, in the present invention, the differential device is applied to a differential device that is housed within the transmission case 1 and allows differential rotation between left and right or front and rear driven wheels of an automobile, but the differential device of the present invention is not limited to the automobile differential device.

Moreover, in the above embodiments, when the first and second hypo groove parts H1 and H2 and the first and second epi groove parts E1 and E2 extend in the peripheral direction along the cycloid curve, the hypo groove part extending along the hypocycloid curve may be one formed by modifying part of the hypocycloid curve, and similarly the epi groove part extending along the epicycloid curve may be one formed by modifying part of the epicycloid curve. For example, it may be arranged by modifying only an apex PO that links a wave and a wave so that other parts satisfy the geometrical requirements of the cycloid curve.

The invention claimed is:

1. A differential device that distributes rotational power of an input plate between a first output shaft and a second output shaft relatively rotatably arranged on a first rotational axis via a cycloid reduction mechanism or a trochoid reduction mechanism, wherein the reduction mechanism comprises a first differential plate that is disposed so as to be adjacent to one side of the input plate rotating around the first rotational axis, a second differential plate that is disposed so as to be adjacent to one side, on the side opposite to the input plate, of the first differential plate, and an eccentric shaft that supports the first differential plate so as to be able to rotate around a second rotational axis that is eccentric from the first rotational axis, the eccentric shaft being connected to the first output shaft so as to be able to rotate as a unit, and the second differential plate being connected to the second output shaft so as to be able to rotate as a unit, a first hypo groove part that extends in a peripheral direction along a hypocycloid curve or a hypotrochoid curve of a first wave number is formed in one side face, opposing the first differential plate, of the input plate, a first epi groove part that extends in the peripheral direction along an epicycloid curve or an epitrochoid curve of a second wave number is formed in one side face, opposing the input plate, of the first differential plate, a plurality of first rolling bodies are held between the first hypo groove part and the first epi groove part in an area where the first hypo groove part and the first epi groove part overlap one on another, a second hypo groove part that extends in the peripheral direction along a hypocycloid curve or a hypotrochoid curve of a third wave number is formed in the other side face, opposing the second differential plate, of the first differential plate, a second epi groove part that extends in the peripheral direction along an epicycloid curve or an epitrochoid curve of a fourth wave number is formed in one side face, opposing the first differential plate, of the second differential plate, a plurality of second rolling bodies are held between the second hypo groove part and the second epi groove part in an area where the second hypo groove part and the second epi groove part overlap one on another, and the first wave number is 8, the second wave number and the third wave number are both 6, and the fourth wave number is 4, or the first wave number and the fourth wave number are both 6, the second wave number is 4, and the third wave number is 8.

2. The differential device according to claim 1,
wherein a differential case that is supported on a transmission case of an automobile so as to be able to rotate around the first rotational axis comprises the input plate and a cover that is fixed to the input plate and covers the first differential plate, the eccentric shaft, and the second differential plate.

3. The differential device according to claim 2,
wherein the eccentric shaft has a center shaft portion that rotates around the first rotational axis and an eccentric shaft portion that projects radially from the center shaft portion and supports the first differential plate so as to be able to rotate around the second rotational axis, the center shaft portion extends through a middle part of the input plate and is connected to the first output shaft, the second differential plate has a center shaft that rotates around the first rotational axis, and the center shaft extends through a middle part of the cover and is connected to the second output shaft.

4. The differential device according to claim 3,
wherein the input plate and the cover have hollow cylindrical first and second shafts that are rotatably supported on the transmission case on the first rotational axis, the center shaft portion of the eccentric shaft is rotatably supported on an inner periphery of the first shaft via a first bearing, the center shaft of the second differential plate is rotatably supported on an inner periphery of the second shaft via a second bearing, and the center shaft portion of the eccentric shaft on a side opposite to the first shaft is fitted via a third bearing into a circular recess portion formed in said one side face of the second differential plate.

5. The differential device according to claim 1,
wherein a cutout portion is formed in a middle part of said one side face of the input plate.

6. The differential device according to claim 1,
wherein a cutout portion is formed in a middle part of said one side face of the input plate, and a balancer that is linked to the eccentric shaft is disposed within the cutout portion so that the balancer rotates around the first rotational axis with a phase that is displaced by 180 degrees from a phase of a center of gravity of the first differential plate rotating around the first rotational axis.

7. The differential device according to claim 6, wherein when a mass of the first differential plate is M1, a mass of the balancer is M2, a distance from the first rotational axis to the center of gravity of the first differential plate when viewed on a projection plane orthogonal to the first rotational axis is e1, and a distance from the first rotational axis to the center of gravity of the balancer is e2, $$|M1 \times e1 - M2 \times e2| < M1 \times e1/100$$

is satisfied.

8. The differential device according to claim 6, wherein the eccentric shaft has a center shaft portion that rotates around the first rotational axis and an eccentric shaft portion that projects radially from the center shaft portion and supports the first differential plate so as to be able to rotate around the second rotational axis, the balancer has an arm portion that extends radially outwardly from an outer periphery of the center shaft portion in a direction that is opposite to a direction in which the eccentric shaft portion projects, and a weight portion that is connected to an extremity of the arm portion, and an outer periphery of the weight portion is formed into an arc shape along an inner periphery of the cutout portion.

9. The differential device according to claim 8, wherein the balancer is formed integrally with the center shaft portion.

10. The differential device according to claim 6, wherein a differential case that is supported on a transmission case of an automobile so as to be able to rotate around the first rotational axis comprises the input plate and a cover that is fixed to the input plate and covers the first differential plate, the eccentric shaft, the balancer and the second differential plate.

11. The differential device according to claim 6, wherein a cylindrical auxiliary cutout portion that opposes the cutout portion of the input plate with the first differential plate sandwiched therebetween is formed in a middle part of said one side face of the second differential plate, and an auxiliary balancer is disposed within the auxiliary cutout portion, the auxiliary balancer being linked to the eccentric shaft so as to rotate around the first rotational axis with the phase that is displaced by 180 degrees from the phase of the center of gravity of the first differential plate rotating around the first rotational axis.

12. The differential device according to claim 1,
wherein the first differential plate is formed so as to include a pair of rotating plates that are linked to each other and can rotate as a unit.

13. The differential device according to claim 7, wherein the eccentric shaft has a center shaft portion that rotates around the first rotational axis and an eccentric shaft portion that projects radially from the center shaft portion and supports the first differential plate so as to be able to rotate around the second rotational axis, the balancer has an arm portion that extends radially outwardly from an outer periphery of the center shaft portion in a direction that is opposite to a direction in which the eccentric shaft portion projects, and a weight portion that is connected to an extremity of the arm portion, and an outer periphery of the weight portion is formed into an arc shape along an inner periphery of the cutout portion.

14. The differential device according to claim 7, wherein a differential case that is supported on a transmission case of an automobile so as to be able to rotate around the first rotational axis comprises the input plate and a cover that is fixed to the input plate and covers the first differential plate, the eccentric shaft, the balancer and the second differential plate.

15. The differential device according to claim 8, wherein a differential case that is supported on a transmission case of an automobile so as to be able to rotate around the first rotational axis comprises the input plate and a cover that is fixed to the input plate and covers the first differential plate, the eccentric shaft, the balancer and the second differential plate.

16. The differential device according to claim 9, wherein a differential case that is supported on a transmission case of an automobile so as to be able to rotate around the first rotational axis comprises the input plate and a cover that is fixed to the input plate and covers the first differential plate, the eccentric shaft, the balancer and the second differential plate.

17. The differential device according to claim 13, wherein a differential case that is supported on a transmission case of an automobile so as to be able to rotate around the first rotational axis comprises the input plate and a cover that is fixed to the input plate and covers the first differential plate, the eccentric shaft, the balancer and the second differential plate.

* * * * *